US008089658B2

(12) United States Patent
Maeyama

(10) Patent No.: US 8,089,658 B2
(45) Date of Patent: Jan. 3, 2012

(54) IMAGE FORMING DEVICE AND METHOD FOR CONTROLLING TONER TEMPERATURE ON PHOTORECEPTOR WHEN A TONER IMAGE IS EXPOSED TO LIGHT

(75) Inventor: Ryuichiro Maeyama, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 533 days.

(21) Appl. No.: 12/261,562

(22) Filed: Oct. 30, 2008

(65) Prior Publication Data

US 2009/0153921 A1 Jun. 18, 2009

(30) Foreign Application Priority Data

Dec. 12, 2007 (JP) ................................. 2007-320870

(51) Int. Cl.
*H04N 1/60* (2006.01)

(52) U.S. Cl. ............. 358/1.9; 358/296; 399/44; 399/66; 399/67; 399/69; 399/94

(58) Field of Classification Search ........................ None
See application file for complete search history.

(56) References Cited

U.S. PATENT DOCUMENTS

| | | | | | |
|---|---|---|---|---|---|
| 4,607,936 | A | * | 8/1986 | Miyakawa et al. | 399/92 |
| 5,887,223 | A | * | 3/1999 | Sakai et al. | 399/60 |
| 5,907,740 | A | * | 5/1999 | Nozawa | 399/43 |
| 6,066,424 | A | * | 5/2000 | Kato | 430/49.31 |
| 6,768,878 | B2 | * | 7/2004 | Komatsu et al. | 399/49 |
| 6,996,361 | B2 | * | 2/2006 | Ichida et al. | 399/302 |
| 7,167,657 | B2 | * | 1/2007 | Inoue et al. | 399/44 |
| 7,642,024 | B2 | * | 1/2010 | Furuya | 430/56 |
| 7,728,858 | B2 | * | 6/2010 | Hara et al. | 347/158 |
| 7,923,183 | B2 | * | 4/2011 | Ito | 430/45.33 |
| 2007/0231723 | A1 | * | 10/2007 | Kimura et al. | 430/108.1 |
| 2007/0274747 | A1 | * | 11/2007 | Kimura et al. | 399/302 |
| 2007/0286644 | A1 | * | 12/2007 | Takegawa | 399/159 |
| 2008/0012926 | A1 | * | 1/2008 | Hara et al. | 347/158 |

FOREIGN PATENT DOCUMENTS

| | | |
|---|---|---|
| JP | 2003-330228 | 11/2003 |
| JP | 2006-281503 | 10/2006 |

* cited by examiner

*Primary Examiner* — King Poon
*Assistant Examiner* — Dung Tran
(74) *Attorney, Agent, or Firm* — Morgan, Lewis & Bockius LLP

(57) ABSTRACT

The present invention provides an image forming device using a toner that maintains a color-generation state or non-color-generation state owing to color-generation information provided by light, comprising: an image forming unit comprising a developing unit including a photoreceptor and the toner that forms a toner image, a color-generation information providing unit that, based on image data, provides the toner with color-generation information by exposing the toner image to light, a transfer unit, a fixing unit, and a color-generating unit that allows respective toner to generate the color, a toner temperature regulating unit, and a control unit that controls the toner temperature regulating unit so the temperature of the toner is within a predetermined range, and an image forming method using the same.

19 Claims, 4 Drawing Sheets

IMAGE FORMING DEVICE AND METHOD FOR CONTROLLING TONER TEMPERATURE ON PHOTORECEPTOR WHEN A TONER IMAGE IS EXPOSED TO LIGHT

CROSS-REFERENCE TO RELATED APPLICATION

This application is based on and claims priority under 35 USC 119 from Japanese Patent Application No. 2007-320870 filed Dec. 12, 2007.

BACKGROUND

1. Technical Field

The present invention relates to an image forming device and an image forming method.

2. Related Art

In conventional electrophotographic color-image recording devices, images in basic three primary colors are developed respectively according to image information, and these toner images are stacked one by one for obtaining a color image. Specifically, the following apparatus structures are known: so-called four-cycle machines that form a color image by developing an image in each color on a photosensitive drum carrying a latent image formed by an image forming method and repeating transfer of the image in each color onto a transfer member; and tandem machines which have image-forming units in the respective colors each having a photosensitive drum and a developing device and which obtain a color image by transferring the toner images onto a travelling transfer member one by one.

These machines are common at least in that they have multiple developing devices for different colors. Accordingly, four developing devices for three primary colors and black are necessary for usual color image formation. In the tandem machines, it is necessary to provide four photosensitive drums corresponding to four developing devices and also a unit that synchronizes the four image-forming units; therefore, increase in the size of the machines and in the cost is inevitable.

SUMMARY

According to an aspect of the invention, there is provided an image forming device using a toner that maintains a color-generation state or non-color-generation state owing to color-generation information provided by light, the device comprising:

an image forming unit containing:

a developing unit that has a photoreceptor and the toner, and that forms a toner image from the toner on the photoreceptor, a color-generation information providing unit that, on the basis of color component information of image data, provides the toner that forms the toner image with color-generation information by exposing the toner image to light, a transfer unit that transfers the toner image onto a recording medium, a fixing unit that fixes the transferred toner image on the recording medium by heat or pressure, and a color-generating unit that heats the transferred toner image on the recording medium, thereby allowing each toner that forms the toner image to respectively generate the color, a toner temperature detection unit that detects the temperature of the toner before the toner is provided with color-generation information by the color-generation information providing unit, a toner temperature regulating unit that regulates the temperature of the toner when the toner is provided with color-generation information by the color-generation information providing unit, and a control unit that, on the basis of a detection result of the toner temperature detection unit, controls the toner temperature regulating unit such that the temperature of the toner when the toner is provided with color-generation information by the color-generation information providing unit is in a predetermined range.

BRIEF DESCRIPTION OF THE DRAWINGS

Exemplary embodiments of the present invention will be described in detail based on the following figures, wherein.

DETAILED DESCRIPTION

Figure 1:
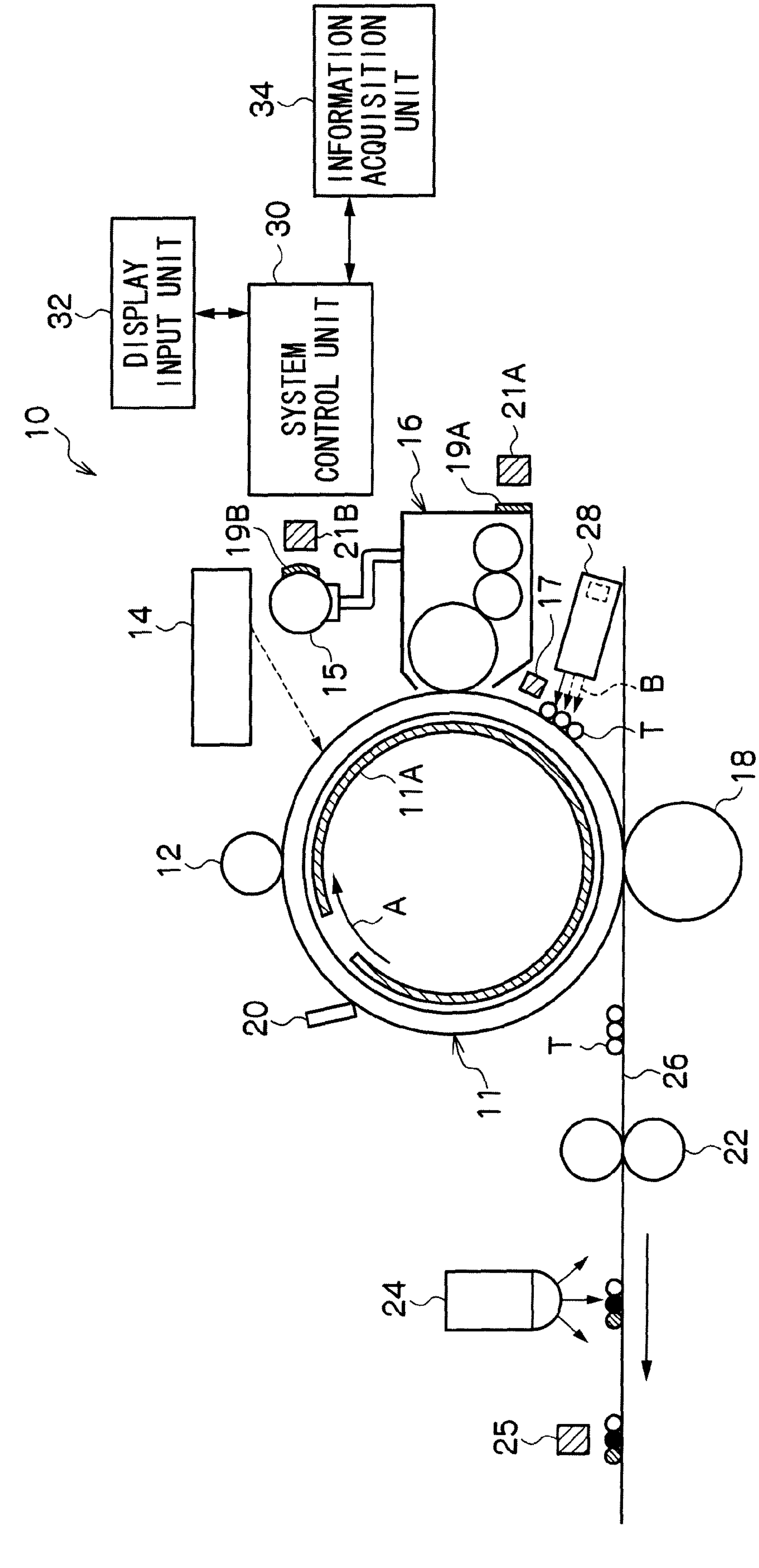
FIG. 1 is a schematic view illustrating the configuration of an example of an image forming device according to the exemplary embodiment.

FIG. 1 is a schematic view illustrating the configuration of an example of an image forming device according to the exemplary embodiment. The image forming device according to the exemplary embodiment is an image forming device of obtaining a color image in an electrophotographic system by using a toner that maintains a color-generation state or non-color-generation state after color-generation information is provided to the toner by light.

The image forming device 10 has a photoreceptor (image carrier) 11 that is commonly used in the electrophotographic process. There are installed, in the neighborhood of the outer circumferential surface of the photoreceptor 11 along the rotation direction of the photoreceptor 11, a charging device 12, an exposure device 14, a developing device 16, a temperature detection sensor 17 (toner temperature detection unit), a color-generation information providing device 28, a transfer device 18 and a cleaner 20 in this order. A fixing device 22 is disposed at downstream side of the transfer device 18. The fixing device 22 also serves as a color-generating device that develops the color of a toner image. A coloring fixing device 24 that irradiates light on a recording medium 26 to fix toner coloring is disposed at downstream side of the fixing device 22. A toner-condition detection sensor 25 (toner-condition detection unit) that detects the condition of a toner after irradiation on the coloring fixing device 24 is also disposed.

In the image forming device, each device operates as shown below to form an image. The charging device 12 uniformly charges the surface of the photoreceptor 11. By the exposure device 14, the photoreceptor 11 charged by the charging device 12 is exposed to light to form an electrostatic latent image. By the developing device 16, the electrostatic latent image on the photoreceptor 11 is developed with the toner to form a toner image corresponding to the electrostatic latent image. The color-generation information providing device 28 irradiates the toner image with a light of specific wavelength range to provide the toner with color-generation information.

In the irradiation of the toner constituting the toner image with a light of specific wavelength range to provide color-generation information, the toner in each of plural regions into which the toner image was divided (for example, the toner in a region corresponding to each pixel) is irradiated with a light of specific wavelength range. When the toner in each region is provided with color-generation information and then heated, a light of specific wavelength corresponding to each region is applied to the toner so as to develop the color of the region (each pixel) corresponding to an image to be formed.

Then, the transfer device 18 transfers the toner image T on the photoreceptor 11 onto a recording medium 26. The fixing device 22 fixes the toner image on the recording medium 26 and simultaneously heats the toner to develop the coloring of the toner. The coloring fixing device 24 irradiates the recording medium 26 with light to fix the coloring of the toner on the recording medium 26. By the cleaner 20, foreign substances such as a residual toner and paper powder on the photoreceptor 11 after transfer are removed from the surface of the photoreceptor 11.

The image forming device 10 in the exemplary embodiment is provided with a system control unit 30 that controls the operation of each device of the image forming device. Further, the image forming device is provided with a display input unit 32 that displays various kinds of information to the user and that is used by the user to input various kinds of information, and with an information acquisition unit 34 used in acquiring image data and image forming instruction information from the outside. The display input unit 32 includes, for example, a touch panel. The information acquisition unit 34 includes, for example, a parallel port, a serial port, and a network port capable of wired or wireless connection to a network.

In the exemplary embodiment, the image forming device includes the color-generation information providing device 28 disposed between the developing device 16 and the transfer device 18. However, the color-generation information providing device 28 may be disposed between the transfer device 18 and the fixing device 22. In this case, the toner image transferred onto the recording medium 26 is irradiated with a light of specific wavelength range to provide color-generation information.

The color-generation information providing device 28 may be disposed inside of the photoreceptor 11, and exposure for providing color-generation information may be carried out inside of the photoreceptor 11. By disposing the color-generation information providing device 28 inside of the photoreceptor 11, the whole of the apparatus can be made further compact. This exposure is so-called backside exposure.

The image forming device according to the exemplary embodiment is described by reference to the electrophotographic process of forming a developed toner image, but the method of forming a developed toner image is not limited thereto. Besides the electrophotographic process, a process (ionography) of forming an electrostatic latent image on a dielectric material as a photoreceptor, for example, with ions, or a process of using a liquid phenomenon, ink-jet, or printing may be used to form a developed toner image.

In the exemplary embodiment, a charging device 12, an exposure device 14, and a developing device 16 correspond to the "developing unit". The whole of the devices involved in an image forming process, such as a photoreceptor 11, a charging device 12, a exposure device 14, a developing device 16, a color-generation information providing device 28, a transfer device 18, a cleaner 20, a fixing device 22 (also acting as a color-generating device), and a coloring fixing device 24 corresponds to the "image forming unit".

Hereinafter, the constitutions of main devices of the image forming device are described in detail.

(Photoreceptor)

First, the photoreceptor (transparent photoreceptor) used in backside exposure is described.

The photoreceptor 11 has a single or multilayer photosensitive layer formed on an electroconductive base material. The photoreceptor 11 may be any known one as long as it is substantially transparent to an exposure light from the color-generation information providing device 28.

The electroconductive base material includes ITO sputtered on a base material such as glass or PET for example in the form of a drum, sheet or plate, a base material coated with a dispersion of ITO fine powder in a binder, and a base material provided thereon with a transparent electroconductive layer coated with an electroconductive polymer.

As the photosensitive layer, an inorganic photosensitive layer such as Se or a-Si, or an organic photosensitive layer may be arranged. When a multilayer photosensitive layer is formed, the layer structure of the photosensitive layer is preferably a layer structure containing a plurality of layers different in composition. For example, when the photosensitive layer is formed as a multi-layer structure consisting of, for example, a charge generating layer, a charge transport layer and a protective layer, the functions of the photosensitive layer can be separated, such that the respective layers may perform their respective functions, thus increasing functionality.

In order to facilitate the scattering of the incident light as color-generation information-providing light to provide the toner with sufficient information light, particles (e.g., particles of metal oxides, organic particles such as particles of fluororesins) having a particle diameter of dozens of nanometers to several microns are preferably dispersed in the photosensitive layer. However, as described above, the photosensitive layer is preferably higher in light transmission because the light should pass through the layer to reach the toner. As for the degree of the light transmittance, the transmittance of the photosensitive layer itself is preferably 50% or more, more preferably 70% or more.

The photoreceptor 11 when used in non-backside exposure may be a member having an electroconductive base material consisting of non-transparent metal or the like. The structure of the photosensitive layer is the same as in the transparent photoreceptor.

The photoreceptor 11 is irradiated with a light for providing color-generation information by the color-generation information providing device 28, wherein the exposure for providing color-generation information is performed at an intensity significantly higher than that for forming a normal latent image. Specifically, the amount of the light energy for providing color-generation information is approximately 1,000 times higher than the light amount (2 $mJ/m^2$) on the photoreceptor used in the normal electrophotographic process. There is thus a concern about the damage on the photoreceptor 11 caused by providing color-generation information, but it is possible to prevent such a problem, for example, by reducing the light sensitivity of the charge-generating layer of the photoreceptor 11 to 1/1000 of that of conventional devices.

The thickness of the photosensitive layer is determined by the transmittance described above (in the case of the transparent photoreceptor) and insulating performance sufficient for ensuring insulation against the charging potential taking the decrease in film thickness over time into consideration. The thickness of the photosensitive layer is preferably in the range of approximately 5 to 50 μm.

When the photoreceptor 11 is belt-shaped, a transparent resin such as PET or PC may be used as the transparent base material. When a transparent base material is not necessary, a metal such as nickel or a resin such as polyimide amide can be used, and the thickness thereof may be decided in consideration of design factors such as the diameter of the rolls stretching the belt-shaped photoreceptor and the tension of the belt-shaped photoreceptor. The thickness may be in the range of approximately 10 to 500 μm. Other details such as layer structure are the same as in the case of the drum-shaped photoreceptor.

The surface of the photoreceptor 11 preferably has a function of preventing the deterioration of the photoreceptor 11 caused by exposure for providing color-generation information in the next step. Specifically, it is effective to arrange a surface layer through which only exposure light for forming a latent image on the surface of the photosensitive layer passes and which reflects or absorbs exposure light for providing color-generation information. The surface layer includes a dichroic mirror coat (reflection) and a sharp cut filter (absorption) having a light-absorbing material dispersed therein.

On the other hand, when a toner image is formed by ionography, a dielectric material is used in place of the photoreceptor 11. The dielectric material may be a transparent dielectric layer of, for example, a transparent plastic material such as PET or PC. The base material is the same as in the photoreceptor 11.

A heater 11A (toner temperature regulating unit) that heats the photoreceptor 11 is arranged inside of the photoreceptor 11 to regulate the surface temperature of the photoreceptor 11, that is, to regulate the temperature of a toner when provided through the surface temperature of the photoreceptor 11 with color-generation information by the color-generation information providing device. The heater 11A uses a known heat source such as a halogen heater, an infrared heater or the like. The shape of the heater 11A is not particularly limited, but in this exemplary embodiment, a sheet heater is used from the viewpoint of efficiently heating the whole of the photoreceptor 11 from the inside.

(Charging Device)

The charging device 12 charges the surface of the photoreceptor 11 uniformly. Any one of known charging devices may be used as the charging device 12. In a contact system, a roll, brush, magnetic brush, blade, or the like may be used, and in a non-contact system, Corotron, Scorotron, or the like may be used. However, the charging device is not limited thereto.

Among them, a contact charger is used favourably in view of the balance between charging compensation capacity and the amount of generated ozone. A contact system charges the surface of the photoreceptor by applying a voltage to a conductive member in contact with the surface of the photoreceptor. The shape of the conductive member is not limited, and may be brush-, blade-, or roll-shaped among which a roll-shaped member is preferable. Usually, a roll-shaped member has, from outside, a resistance layer, an elastic layer supporting the same, and a core material. The member may have, as needed, a protective layer outside the resistance layer.

During charging of the photoreceptor 11 with the conductive member, a voltage is applied to the conductive member, and the applied voltage is preferably a DC voltage or a DC voltage superposed with an AC voltage. When charging is performed only with direct current, the absolute value of the voltage, whether positive or negative, is preferably the desired surface electric potential+approximately 500 V, preferably in the range of 100 to 1,500 V, and more preferably in the range of 100 to 1,000 V.

When AC voltage is superposed, the direct current may be within about ±50 V from the desired surface electric potential, the interpeak voltage of the alternate current (Vpp) is preferably 400 to 1,800 V, more preferably 800 to 1,600 V; the frequency of the AC voltage is 50 to 20,000 Hz, preferably 100 to 5,000 Hz; and the waveform of the AC voltage may be any one of a sine wave, a rectangular wave, or a triangular wave. The charging potential is preferably adjusted in the range of 150 to 1000 V in terms of the absolute value of the electric potential.

(Exposure Device)

By the exposure device 14, the photoreceptor 11 charged with the charging device 12 is exposed to a light to form an electrostatic latent image. Any one of known exposure devices may be used as the exposure device 14 for forming an electrostatic latent image. Examples of the exposure device 14 include a laser scanning system using a ROS (raster output scanner), a LED image bar system, an analog light-exposure unit, an ion-current control head, and the like. As shown by arrow A in FIG. 1, the surface of the photoreceptor 11 can be subjected to exposure by irradiating it with a beam from a light source (not shown) of the exposure device 14. In addition, a new light-exposure unit to be developed in the future may also be used as long as the advantageous effects of aspects of the invention are obtained.

The wavelength of the light irradiated from the exposure device 14 to the photoreceptor 11 is in the spectral sensitivity region of the photoreceptor 11. The photosensitive layer of the photoreceptor 11 is a layer hardly showing absorption in the wavelength range of exposure lights to provide color-generation information. Accordingly, lights in a wavelength range adjusted to the absorption wavelength range of the photoreceptor 11 are used. For example, when the absorption wavelength range of the photoreceptor 11 is 700 nm or more, a semiconductor laser having a wavelength at 780 nm as exposure light is preferably used.

Irradiation on the photoreceptor 11 is performed at the toner-developing position described below in the case of reversed development and to the position other than the toner-developing position in the case of normal development, for example, at a light amount of the logical sum of pieces of image-forming information for the 4 colors. The irradiation-spot diameter is preferably in the range of 40 to 80 μm in order to control the resolution at 600 to 1,200 dpi.

As for the exposure energy, the electric potential in the exposed region on the photoreceptor 11 (post-exposure electric potential) is preferably in the range of about 5 to 30% of the charging potential described above. The amount of the toner developed onto the photoreceptor 11 can be regulated by regulating the amount of exposure light, and the amount of an adhering toner image can be regulated. By altering the amount of exposure light according to the adhesion amount necessary for each exposure position, the amount of the toner to be developed can be varied.

On the other hand, in the case of the ionography, a latent image is formed on the photoreceptor with an ionic writing head (ionic writing step). Examples of the ionic writing heads include those controlling on/off of the ion current according to image signal (Japanese Patent Application Laid-Open (JP-A) No. 4-122654), those controlling on/off of the ion current generation (JP-A No. 6-99610), and the like, A dielectric material as well as a photoreceptor may be used as the photoreceptor in such a system.

(Developing Device)

The developing device 16 forms a developed toner image corresponding to the electrostatic latent image on the photoreceptor 11 by developing the electrostatic latent image with a toner.

Any one of known developing units may be used as the developing device 16. The developing method may be any developing method, examples of which include a two-component developing method using a toner and particles called carrier that holds the toner, a mono-component developing method of using only toner, and developing methods which are modifications to the above methods and which involve use of other additives for improving development and other characteristics.

The developing method in which the developer contacts the photoreceptor 11, or a developing method in which the developer does not contact the photoreceptor 11, may be used. In addition, a hybrid developing method, which is a combination of a mono-component developing method and a two-component developing method may also be used. Further, new developing units to be developed in the future may also be used as long as the advantageous effects of aspects of the invention are obtained.

The toner contained in the developer may contain, for example, a color-generating portion capable of developing Y color (Y color-generating portion), a color-generating portion capable of developing M color (M color-generating portion) and a color-generating portion capable of developing C color (C color-generating portion) in a single toner particle. As an alternative, the Y color-generating portion, the M color-generating portion, or the C color-generating portion may be contained separately in different toner particles.

The developing toner amount (amount of the toner deposited on the photoreceptor) may vary depending on the image to be formed, but is preferably in the range of 3.5 to 8.0 $g/m^2$, more preferably in the range of 4.0 to 6.0 $g/m^2$ in the case of a solid image.

The thickness of the toner layer in the obtained toner image may be not more than a certain value such that the light for providing color-generation information described below reaches the entire irradiated region. Specifically, for example, the number of the toner layers of a solid image is preferably 3 or less, more preferably 2 or less. The toner layer thickness above is a value obtained by measuring the thickness of the toner layer actually formed on the surface of the photoreceptor 11 and dividing the thickness by the number-average particle diameter of toner.

In the exemplary embodiment, a toner cartridge 15 that replenishes a toner accommodation part of the developing device 16 with a replenishing toner is connected to the developing device 16. This toner cartridge 15 is formed in the form of a cartridge detachable from the body of the image forming device for the purpose of replenishing a replenishing toner as needed. In the exemplary embodiment, the developing device 16 is also formed in the form of a cartridge so as to be detachable from the body of the image forming device. The developing device 16 in a cartridge form is a so-called process cartridge. In the exemplary embodiment, the developing device 16 is described by reference to the device in the form of a process cartridge, but is not limited thereto and may be for example a process cartridge integrated with other members (for example, photoreceptor 11, charging device 12, cleaner 20 etc.).

The developing device 16 as a process cartridge and the toner cartridge 15 are provided thereon with temperature-indicating materials 19A and 19B that change their color depending on applied heat. The temperature-indicating materials 19A and 19B are members which change their color reversibly or irreversibly for example when heated at a predetermined temperature or more. If the member (each cartridge) has undergone heating even once in the past, this heat history is recognized with the temperature-indicating materials 19A and 19B as members that change their color reversibly or irreversibly upon heating at a predetermined temperature or more. The temperature-indicating materials 19A and 19B may be labeled with a sheet before arrangement or may be coated with a paint before arrangement.

Such temperature-indicating materials 19A and 19B include “Thermolabel” series and “Thermopaint” series manufactured by Nichiyu Giken Kogyo Co., Ltd.. Either the temperature-indicating material 19A or 19B may be arranged to show heat history with one temperature as a standard, or the two may be arranged to show heat history with two temperatures as standards in the range. As a matter of course, two or more temperature-indicating materials may also be used. As the temperature-indicating materials 19A and 19B, various products are commercially available and may be used in combination thereof. Specifically, if coloring deficiency occurs where the temperature of each cartridge (accommodated toner) is higher than 80° C. for example, then a temperature-indicating agent that changes its color irreversibly with at a temperature higher than a predetermined temperature of 80° C. (trade name: “Thermolabel 1K-80” manufactured by Nichiyu Giken Kogyo Co., Ltd.) may be arranged singly to indicate whether or not each cartridge, that is, the toner accommodated therein, has undergone heating higher than the predetermined temperature.

When each cartridge is attached to the body of the image forming device, color detection sensors 21A and 21B that detect the colors of the temperature-indicating 19A and 19B are disposed to face the temperature-indicating materials 19A and 19B. The color detection sensors 21A and 21B are sensors that detect the colors of the temperature-indicating materials 19A and 19B, thereby judging whether the colors have been changed relative to the original colors (that is, colors before color change) of the temperature-indicating materials 19A and 19B. Digital color judgment sensors (CZ-10, CZ-11, CZ-40, CZ-41 etc.) manufactured by Keyence Corporation are used as the color detection sensors 21A and 21B.

(Temperature Detection Sensor)

The temperature detection sensor 17 is a sensor that measures the surface temperature of the photoreceptor 11, and based on the surface temperature of the photoreceptor 11, detects the temperature of a toner upon exposure to light for providing color-generation information. The exemplary embodiment will be described by reference to a mode wherein the temperature of a toner is detected based on the surface temperature of the photoreceptor 11, but may be a mode where the temperature of a toner constituting a toner image is directly detected by the temperature detection sensor 17.

In a preferable mode, the temperature detection sensor 17 is disposed between the developing device 16 and the color-generation information providing device 28, thereby enabling accurate measurement of the temperature of the photoreceptor 11 (toner) just before exposure of the toner to light for providing color-generation information. However, this arrangement is not limitative, and other arrangements may be used.

A thermistor, a thermocouple or an infrared thermometer is used as the temperature detection sensor 17, and an infrared thermometer in a non-contact system is preferable for measurement of the surface temperature of the photoreceptor 11. For measurement of a non-image forming region of the photoreceptor 11, a thermistor or thermocouple in a contact system is also used as the temperature detection sensor 17.

(Color-Generation Information Providing Device)

The color-generation information providing device 28 irradiates a developed toner image with a light of specific wavelength to provide color-generation information. The color-generation information providing device 28 may be an exposure unit that can irradiate a developed toner image with a light of wavelength for developing a specific color of toner particles when provided with color-generation information, and a known exposure unit can be used.

The color-generation information providing unit 28 includes a light source which on the basis of information on color components in image data, emits a light of predetermined wavelength corresponding to the color to be developed. In the exemplary embodiment, the color-generation information providing device 28 includes a light source for providing color-generation information for coloring a yellow color-generating portion, a light source for providing color-generation information for coloring a magenta color-generating portion, and a light source for providing color-generation information for coloring a cyan color-generating portion.

A light emitted from each light source is irradiated on each toner constituting a developed toner image formed on the photoreceptor 11, thereby providing each toner with color-generation information. That is, the toner located in each of plural regions into which a developed toner image was divided (for example, the toner in a region divided for each dot) is provided with color-generation information by the light emitted from each light source, thereby developing color in accordance with image data.

The color-generation information providing device 28 may make use of a laser scanning system using a ROS, a LED image bar system, and the like. As shown by arrow B in FIG. 1, the surface of the photoreceptor 11 can be subjected to exposure by irradiating it with a beam from a light source (not shown) of the color-generation information providing device 28. In addition, a new light-exposure unit to be developed in the future may also be used as long as the advantageous effects of aspects of the invention are obtained.

The irradiation spot diameter of the light irradiated on the developed toner image is preferably adjusted to be in the range of 10 to 300 μm, more preferably in the range of 20 to 200 μm, so that the resolution of the image formed falls in the range of 100 to 2,400 dpi.

The wavelength of the light supplied for maintaining a color-generation state or non-color-generation state (exposure for providing color-generation information) should be in the range of wavelengths to be absorbed by the toner, and is determined by the material design of the toner to be used. For example, when a toner that develops color by irradiation with a light of specific wavelength (photocoloring toner) is used, light at 405 nm (λy light) is irradiated at the desired position to develop yellow (Y color); light at 535 nm (λm light) is irradiated at the desired position to develop magenta (M color); and light at 657 nm (λc light) is irradiated at the desired position to develop cyan (C color).

When the photocoloring toner is used in developing a secondary color, a combination of the above lights is used; that is, the λy and λm lights are irradiated at the desired position to develop red (R color); the λy and λc lights are irradiated at the desired position to develop green (G color); and the λm and λc lights are irradiated at the desired position to develop blue (B color). When black (K color) that is a tertiary color is developed, the λy, λm and λc lights are irradiated at the desired position.

When a toner maintaining a non-colored state by irradiation with a light of specific wavelength (non-photocoloring toner) is used, light at 405 nm (λy light) is irradiated at the desired position to prevent development of yellow (Y color); light at 535 nm (λm light) is irradiated at the desired position to prevent development of magenta (M color); and light at 657 nm (λc light) is irradiated at the desired position to prevent development of cyan (C color). Accordingly, the λm and λc lights are irradiated at the desired position to develop Y color; the λy and λc lights are irradiated at the desired position to develop M color; and the λy and λm lights are irradiated at the desired position to develop C color.

When the non-photocoloring toner is used in developing a secondary color, a combination of the above light is irradiated; that is, the λc light is irradiated at the desired position to develop red (R color); the λm light is irradiated at the desired position to develop green (G color); and the λy light is irradiated at the desired position to develop blue (B color). No light is irradiated at the desired position to develop black (K color) that is a tertiary color.

The light from the color-generation information providing device 28 may be modulated as needed by a known image-modulating method, for example, by pulse width modulation, strength modulation, or combination thereof. The exposure energy of the light is preferably in the range of 0.05 or about 0.05 to 0.8 or about 0.8 mJ/$cm^2$, more preferably in the range of 0.1 or about 0.1 to 0.6 or about 0.6 mJ/$cm^2$. The exposure energy needed is correlated with the amount of the developed toner, and for example, exposure in the range of 0.2 or about 0.2 to 0.4 or about 0.4 mJ/$m^2$ is preferable when the developing toner amount (solid image) is approximately 5.5 g/$m^2$.

(Transfer Device)

The transfer device 18 transfers the toner image on the photoreceptor 11 onto a recording medium 26. Thereafter, the toners provided with color-generation information are transferred all at once to a recording medium 26. The recording medium 26 fed from a feeding unit (not shown) is transferred with a transfer roll (not shown) or the like to a position supported by both the photoreceptor 11 and transfer device 18 and transferred by supporting with the photoreceptor 11 and transfer device 18, thereby transferring the toner image on the photoreceptor 11 onto the recording medium 26.

Any one of known transfer devices may be used as the transfer device 18. For example, a roll, brush, blade, or the like may be used in a contact system, and Corotron, Scorotron, Pin array charger, or the like may be used in a non-contact system. The toner image can also be transferred by pressure or by pressure and heat. The transfer bias is preferably in the range of 300 to 1,000 V (absolute value), and an alternate current (Vpp: 400 V to 4 kV, 400 to 3 kHz) may be superposed.

(Fixing Device)

The fixing device 22 has a role as a color-generating device for developing the color of the toner image, and fixes the toner image on the recording medium 26 and simultaneously heats the toner to develop its color. The toner image under a condition capable of coloration (or capable of maintaining a non-colored state) is colored by heating the recording medium 26 with the fixing device 22.

Any one of known fixing units may be used as the fixing device 22. For example, the heating member or the pressurizing member may be a roll or a belt, and the heat source for use may be a halogen lamp, IH, or the like. The fixing device is compatible with various paper-transportation passes such as a straight pass, a rear C pass, a front C pass, an S pass, and a side C pass.

In the image forming device according to the exemplary embodiment, the fixing device 22 acts both as a color-generating unit and as a fixing unit, but a color-generating device may be arranged separately from a fixing device. The location of the color-generating device installed for the color-generating step is not particularly limited, and may be for example a position at which the color-generating device can allow the toner image to develop color before the toner image is fixed on the recording medium 26 with the fixing device 22.

Various color-generating methods are available in accordance with the coloring mechanism of the toner particles. For example, when the toner is colored by curing or photo-decomposing a coloring-related substance in the toner through irradiation with light having a wavelength that is outside the above-mentioned specific wavelength range, a light emitting apparatus that emits the light having the wavelength may be used. As an alternative, the toner may be colored by using a pressure-applying apparatus that applies pressure to break encapsulated coloring particles.

However, the chemical reaction occurring in the toner to cause coloring is slow because the reaction involves migration and diffusion that proceeds slowly in general. Therefore, it is necessary to provide sufficient diffusion energy regardless of which method is used. For this reason, a method of accelerating the reaction by heating is most advantageous for color development of the toner. Accordingly, the fixing device 22 that serves both as the coloring unit and as the fixing unit is preferably used.

(Coloring Fixing Device)

The coloring fixing device 24 irradiates the recording medium 26 with a light for fixing toner coloring. By this irradiation, the coloring fixing device 24 can decompose or inactivate the reactive substances remaining in the color-generating portion that is controlled to be unable to develop color. Thus, the coloring fixing device 24 ensures prevention of the variation in color balance after image formation more, and removes or bleaches the background color.

The coloring fixing device 24 is not particularly limited as long as it can inhibit the progress of the color development of the toner, and any one of known lamps such as fluorescent lamp, LED, or EL may be used. The light from the coloring fixing device 24 may include three wavelengths for causing color development of the toner; the illuminance is preferably in the range of approximately 2,000 to 200,000 lux; and the exposure time is preferably in the range of 0.5 to 60 sec.

In the image forming device according to the exemplary embodiment, the coloring fixing device 24 is disposed at downstream side of the fixing device 22, but in the case of a fixing method not involving heat melting, for example, in a pressure fixing method using pressure, the coloring fixing device 24 may be arranged at upstream side of the fixing device 22. Alternatively, the coloring fixing device 24 may be omitted.

(Toner-Condition Detection Sensor)

The toner-condition detection sensor 25 is a sensor that detects the condition of a toner after light irradiation with the coloring fixing device 24, that is, the condition of a toner after color fixing. Detection of the condition of a toner refers to detection of the color or gloss of a toner after color fixing. The toner-condition detection sensor 25 is a sensor of judging whether desired color development is achieved or not, whether desired gloss appears or not, etc., based on acquired image data with intended color development or gloss as a standard.

When digital color judgment sensors (trade name: CZ-10, CZ-11, CZ-40, CZ-41 etc.) and gloss judgment sensors (trade name: CZ-35, CZ-H35S, CZ-H37S, CZ-H52, CZ-H72 etc.), all of which are manufactured by Keyence Corporation, may be used as the toner-condition detection sensor 25. For example, when a digital color judgment sensor is used, the color development of the toner after color fixing is detected, and by using image data obtained as a standard, it is judged whether the desired coloring of the toner after color fixing appears or not. When a gloss judgment sensor is used, the degree of gloss of the toner after color fixing is detected, and by using image data obtained as a standard, it is judged whether the desired gloss of the toner after color fixing appears or not. Whether the desired gloss appears or not is determined by examining the degree of gloss of the resulting toner that is varied as a result of appearance of desired gloss. In the exemplary embodiment, a digital color judgment sensor is used as the toner-condition detection sensor 25. Further, a toner temperature detection is also used as the toner-condition detection.

(System Control Unit)

The image forming device 10 in the exemplary embodiment also has a system control unit 30 that controls the entire image forming device 10. The system control unit 30 is connected to each device and each sensor such that data and signal can be sent and received. The system control unit 30 is also connected to various devices (not shown) installed in the image forming device 10 such that data and signal can be sent and received.

Figure 2:
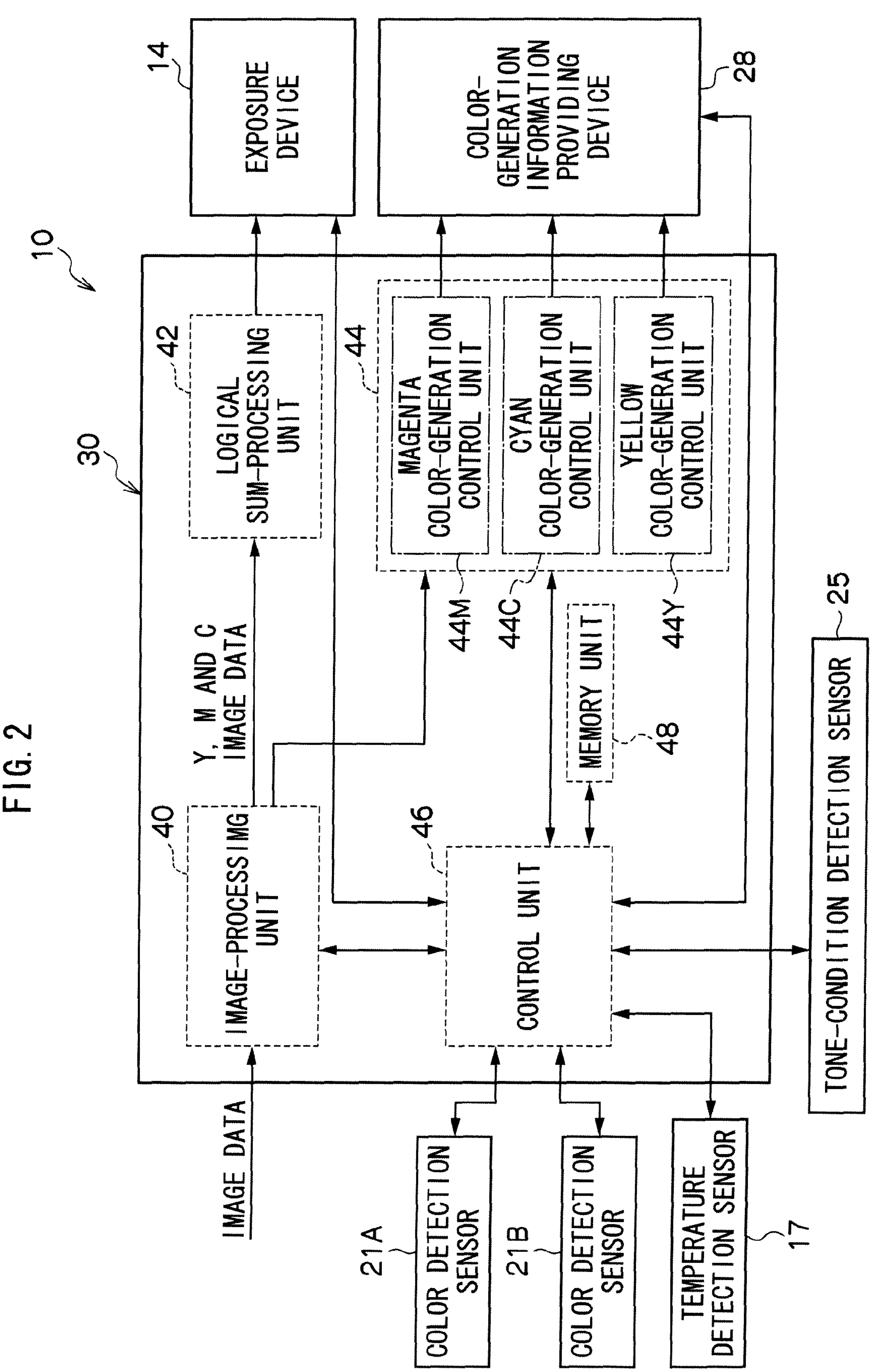
FIG. 2 is a schematic view illustrating the electric configuration of an image forming device according to the exemplary embodiment.

Specifically, the system control unit 30 as shown in FIG. 2 has an image-processing unit 40, a logical sum-processing unit 42, a color-development control unit 44, a memory unit 48, and a control unit 46.

The image-processing unit 40, color-development control unit 44, memory unit 48, exposure device 14, color-generation information providing apparatus 28, temperature detection sensor 17, color detection sensors 21A and 21B, and toner-condition detection sensor 25 are connected respectively to the control unit 46 such that data and signal can be sent and received. Though not shown in the FIG. 2, other devices such as charging device 12, developing device 16, fixing device 22 and coloring fixing device 24 are also connected to the control unit 46 such that data and signal can be sent and received.

The memory unit 48 stores processing routines and various data (for example, color information on the temperature-indicating materials 19A and 19B before change in color, information on color to be developed by the toner on the basis of obtained image data, etc.). The control unit 46 controls the respective devices contained in the image forming device 10.

When image data on an image formed in the image forming device 10, which are input via a communication unit (not shown) from an external device such as a personal computer (not shown), are RGB data, the image-processing unit 40 converts the data into YMC data, and the converted color data are output to the logical sum-processing unit 42 as pixel data (Y pixel data, M pixel data, and C pixel data) of the respective pixels of the image when recorded on the recording medium 26.

When the image data are input into the image-processing unit 40, the logical sum-processing unit 42 calculates the logical sum of the CMY data for each pixel and outputs the calculated logical sum data to the exposure device 14. That is, the logical sum data including all CMY image data are input to the exposure device 14.

The pixel data contain information of the colors YMC. The exposure device 14 exposes the surface of the photoreceptor 11 to light based on the input logical sum data.

The YMC pixel data output from the image-processing unit 40 to the logical sum-processing unit 42 are also output to the color-development control unit 44. The color-development control unit 44 includes a magenta color-development control unit 44M that controls development of magenta color, a cyan color-development control unit 44C that controls development of cyan color, and a yellow color-development control unit 44Y that controls development of yellow color.

The M pixel data, C pixel data and Y pixel data input respectively to the magenta color-development control unit 44M, cyan color-development control unit 44C and yellow color-development control unit 44Y are output to the color-generation information providing device 28 under control of the control unit 46.

As described above, information on the colors YMC are contained in the each pixel data. The color-generation information providing device 28 irradiates the surface of the photoreceptor 11 with a light of wavelength corresponding to the color of each pixel, based on the input pixel data on the colors.

As described above, the image forming device 10 according to the exemplary embodiment is constituted such that an electrostatic latent image corresponding to image data can be formed on the photoreceptor under the control of the control unit 46 and also that color-generation information can be provided to each toner constituting the electrostatic latent image.

Hereinafter, processing executed in the control unit 46 of the image forming device 10 in the exemplary embodiment will be described.

Figure 3:
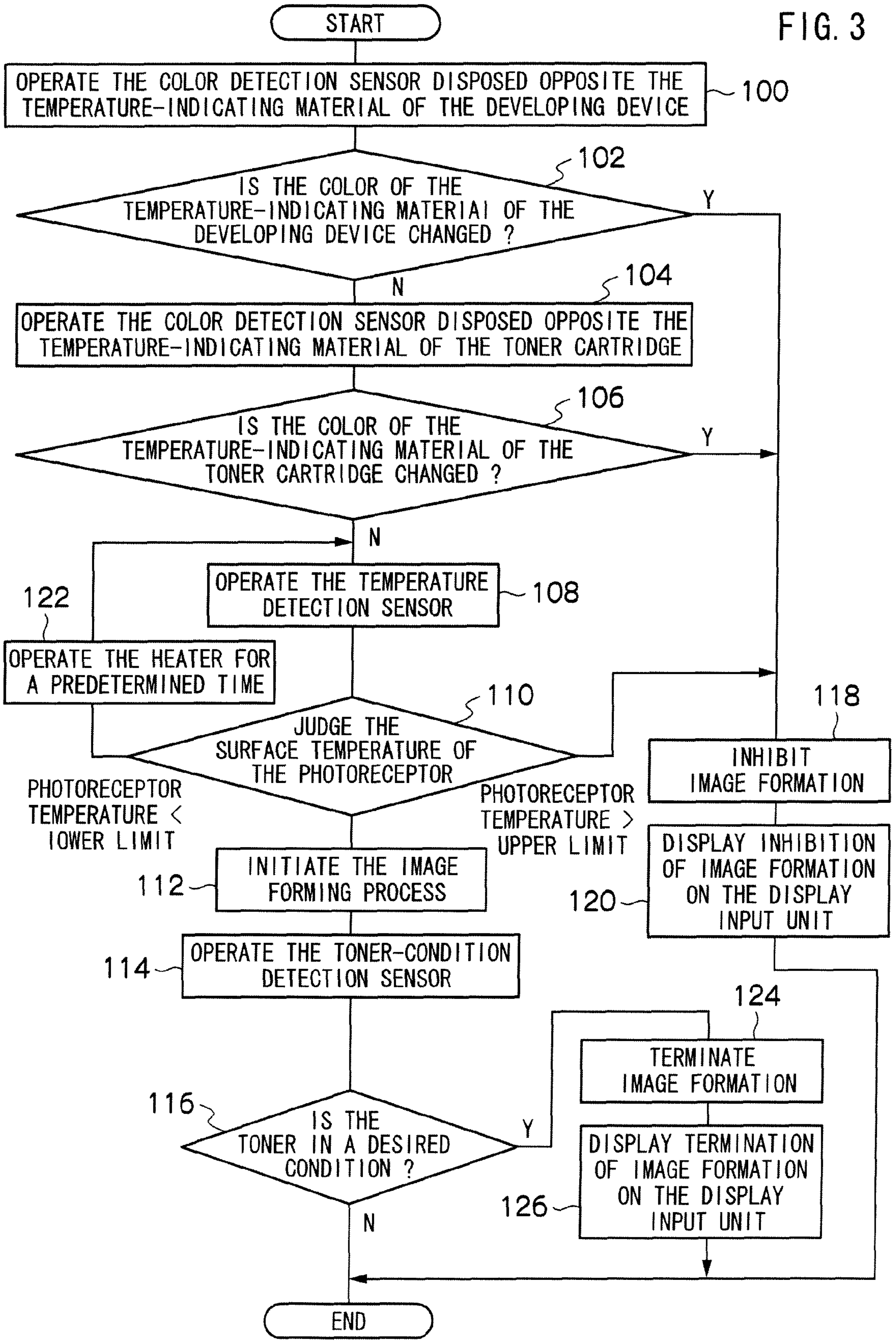
FIG. 3 is a flowchart showing processes executed in a control unit of an image forming device according to the exemplary embodiment.

When the image data on an image to be formed in the image forming device 10, which are input via an information acquisition unit 34 from an external device such as a personal computer, are acquired, a processing routine shown in FIG. 3 for example is executed and advances to Step 100.

In Step 100, the color detection sensor 21A disposed opposite the temperature-indicating material 19A of the developing device 16 is operated to detect the color of the temperature-indicating material 19A. Then, the processing advances to Step 102. In Step 102, when it is judged that the color of the temperature-indicating material 19A of the developing device 16 is not changed according to the detection result of the color detection sensor 21A, the processing advances to Step 104, while when it is judged that the color of the temperature-indicating material 19A of the developing device 16 is changed, the processing advances to Step 118 where image formation is inhibited, and the processing advances to Step 120 where inhibition of image formation is displayed on a display input unit 32, and the processing is terminated.

In Step 104, the color detection sensor 21B disposed opposite the temperature-indicating material 19B of the toner cartridge 15 is oprated to detect the color of the temperature-indicating material 19B. Then, the processing advances to Step 106. In Step 106, when it is judged that the color of the temperature-indicating material 19B of the toner cartridge 15 is not changed according to the detection result of the color detection sensor 21B, the processing advances to Step 108, while when it is judged that the color of the temperature-indicating material 19B of the developing device 16 is changed, the processing advances to Step 118 where image formation is inhibited, and the processing advances to Step 120 where inhibition of image formation is displayed on a display input unit 32, and the processing is terminated.

Whether the colors of the temperature-indicating materials 19A and 19B are changed or not is judged as follows: Color information measured in the color detection sensors 21A and 21B is compared with the color information on the temperature-indicating materials 19A and 19B before change in color, which has previously been memorized in the memory unit 48, and when both agree with each other, it is judged that the color was not changed, while when both are different from each other, it is judged that color change occurred. The judgment that the color was not changed is not limited to a case in which both agree completely, but may also include a case in which both agree within a predetermined range.

In Step 108, the temperature detection sensor 17 disposed opposite the photoreceptor 11 is driven to detect the surface temperature of the photoreceptor 11, and the processing advances to Step 110.

In Step 110, the surface temperature of the photoreceptor 11 is judged according to the detection result of the temperature detection sensor 17. When the surface temperature of the photoreceptor 11 is judged to be higher the upper limit of a predetermined range, the processing advances to Step 118 where image formation is inhibited, and the processing advances to Step 120 where inhibition of image formation is displayed on the display input unit 32, and the processing is terminated. On the other hand, when the surface temperature of the photoreceptor 11 is judged to be lower than the lower limit of a predetermined range by the detection result of the temperature detection sensor 17, the processing advances to Step 122 where a heater 11A is driven for a predetermined time (for example, 5 seconds to 30 seconds) to heat the photoreceptor 11, and the processing is returned to Step 108. In the case of other judgment, for example when the surface temperature of the photoreceptor 11 is judged to be in a predetermined range, the processing advances to Step 112.

In Step 112, the image forming process is initiated (allowed), and the respective devices involved in the image forming process are driven so that charging of the photoreceptor 11, formation of a latent image, formation of a toner image, provision of the toner image with color-generation information, transfer of the toner image onto a recording medium, fixing and color development of the transferred toner image, and fixing of toner image coloring are executed sequentially to form an image on the recording medium. Then, the processing advances to Step 114.

In Step 114, the toner-condition detection sensor 25 is driven to detect the condition of the image (condition of the toner image) formed on the recording medium. Specifically in the exemplary embodiment, a digital color judgment sensor is used as the toner-condition detection sensor 25, and the color of the toner image formed on the recording medium is detected. Then, the processing advances to Step 116.

In Step 116, the processing is terminated when the toner image formed on the recording medium assumes desired color according to the detection result of the toner-condition detection sensor 25, that is, when the toner image is judged to be in a desired state. On the other hand, when the toner image formed on the recording medium does not assume desired color, that is, when the toner image is judged not to be in a desired state, the processing advances to Step 124 where image formation is terminated, and the processing advances to Step 126 where termination of image formation is displayed on the display input unit 32, and the processing is terminated. Termination of image formation is carried out after output of a predetermined number of sheets (1 to 5 sheets).

Judgment of whether the toner image formed on the recording medium assumes desired color (that is, judgment of whether the toner image is in a desired state) is conducted as follows: Color information measured in the toner-condition detection sensor 25 (digital color judgment sensor) is compared with the color information on the image data that has previously been memorized in the memory unit 48, and when both agree with each other, it is judged that the toner image formed on the recording medium assumes desired color (that is, the toner image is judged to be in a desired state), while when both are different from each other, it is judged that the toner image formed on the recording medium does not assume desired color (that is, the toner image is judged not to be in a desired state). When both agree with each other not only completely but also to a predetermined degree, it may be judged that the toner image formed on the recording medium assumes desired color (that is, the toner image is judged to be in a desired state).

In the image forming device 10 in the exemplary embodiment described above, the toner image having a toner temperature in a predetermined range under the control of the control unit 46 is provided with color-generation information by the color-generation information providing unit, and thus an image is formed by inhibiting a change in color. This is based on the fact that by providing color-generation information by light, the toner maintaining a color-generation state or non-color-generation state, used in the exemplary embodiment, changes its color depending on the temperature when color-generation information is provided by the color-generation information providing device 28. That is, the toner is excellently colored or uncolored in a predetermined range (for example, 0° C. to 90° C., preferably 10° C. to 80° C.) by providing the toner with color-generation information by the color-generation information providing device 28.

As will be described in detail later, the toner of the invention that maintains a coloring or uncolored state is a toner that controls coloring and uncoloring by using two components (first and second components) which are separated from each other and which develop color through reaction with each other, by providing the toner with color-generation information by light. Accordingly, it is estimated that when the toner is provided with color-generation information lower than the lower limit of a predetermined range by the color-generation information providing device 28, the 2 components are hardly transferred in the toner, thus resulting in no coloring or slight coloring. On the other hand, it is estimated that when the toner is provided with color-generation information higher than the upper limit of a predetermined range by the color-generation information providing device 28, the 2 components are transferred by thermal motion to regions to be reacted for coloring, thus resulting in developing unintended color (for example, 7 colors (rainbow color)).

Accordingly, the image forming device 10 in the exemplary embodiment forms an image by inhibiting the change in color of the toner.

Particularly in the exemplary embodiment, when heat higher than the upper limit of a predetermined range is applied even once to the toner, its components are transferred in the toner by thermal motion to regions to be reacted for coloring, thus resulting in difficult development of intended color, and thus when the temperature of the toner (the temperature of the surface of the photoreceptor 11 in the exemplary embodiment) is higher than the upper limit of a predetermined range, image formation is inhibited by the control unit 46. Accordingly, the toner maintaining a color-generation state or non-color-generation state, whose desired color is made hardly developable due to heat history, is prevented from forming an inappropriate image by providing it with color-generation information with light.

In the exemplary embodiment, the temperature of the toner is detected based on the surface temperature of the photoreceptor 11, and thus the change in color of the toner attributable to environmental temperature can be suppressed. On the other hand, when the temperature of the toner is detected directly by the temperature detection sensor 17, the change in color of the toner attributable to self-heating by collision friction among particles can also be suppressed.

In the exemplary embodiment, when the developing device 16 as a process cartridge and the toner cartridge are provided with a temperature higher than the upper limit of the predetermined value, the change in color of the temperature-indicating materials 19A and 19B is detected and image formation is inhibited by the control unit 46. Accordingly, when the desired color of the toner is made hardly developable by heat history of the process cartridge (developing device 16) and toner cartridge 15, the toner can be prevented from forming an inappropriate image.

Before the developing device 16 as a process cartridge and the toner cartridge are fit to the image forming device, the user visually can recognize a change in color of the temperature-indicating materials 19A and 19B, to replace the member that has undergone color change by another one not undergoing color change, so that the toner made hardly developable due to the heat history of the process cartridge (developing device 16) and toner cartridge 15 is prevented from forming an inappropriate image.

In this exemplary embodiment, when the predetermined state of the toner is judged not to be obtained as a result of detection of the condition of the toner after color fixing (that is, when the predetermined coloring is not attained in the exemplary embodiment), image formation is suspended. Accordingly, even when the color of the colored toner is changed, an inappropriate image is thereafter prevented from being formed.

Hereinafter, the toner used in the image forming device 10 in the exemplary embodiment is described. The toner is controlled to maintain a color-generation state or non-color-generation state by providing color-generation information by light.

For example, the toner has a function of maintaining a state in which the toner develops or does not develop the color determined depending on the wavelength of the exposure light after each toner particle is exposed to light different in wavelength. That is, the inside of the toner contains a color-generating substance that can develop color (and a color-generating portion containing the same) by providing it with color-generation information by light, and the toner is controlled to maintain a color-generating or non-color-generating state by being provided with the color-generation information by light.

The expression "color-generation information is provided by light" means that a desired region of a toner image is exposed selectively to one or more lights having particular wavelengths or the desired region is not exposed to any light, so as to control the color-generating/non-color-generating state of individual toner particles or so as to control the color tone of the individual toner particles when the toner particles are colored.

When color-generation information is provided by light exposure, the toner particles constituting the toner image maintain the color-generating state that can develop the color determined depending on the wavelength of the exposure light, or the non-color-generating state that does not develop the color determined depending on the wavelength of the exposure light.

The toner contains at least two kinds of reactive components (hereinafter, referred to as first and second components) that develop color through reaction with each other as color-generating substances and a color-generating portion (described below) containing the color-generating substances. The toner maintains the color-generating or non-color-generating state when color-generation information is provided by light, and develops color when heated.

In the toner, the first and second components are contained in separate matrices, so that diffusion therebetween is difficult unless color-generation information is provided. In other words, the first and second components are separated from each other.

Specifically, the first component is contained in a first matrix; and the second component is contained in a matrix (second matrix) other than the first matrix. There may be a barrier between the first and second matrices, the barrier having a function of prohibiting diffusion of substances between the matrices and a function of allowing, when an external stimulus such as heat is applied, diffusion of substances between the matrices according to the type, strength, and combination of the stimuli.

By using the barrier to arrange the two kinds of reactive components in the toner, it is preferable to use microcapsules wherein, in the toner, one of the two kinds of reactive components (the first or second component) is contained in microcapsules and the other component is contained outside the microcapsules.

When the first component is contained in microcapsules and the second component is contained outside the microcapsules, the interior of the microcapsules is the first matrix and outside of the microcapsules is the second matrix.

The microcapsules, which have a core and a shell covering the core region, are not particularly limited as long as they have a function of prohibiting diffusion of substances inward or outward through the microcapsules unless an external stimulus such as heat is applied and allowing diffusion of substances inward or outward through the microcapsule when such an external stimulus applied, the allowance of the diffusion being in accordance with the type, strength, and combination of the stimuli. At least one of the reactive components is contained in the core region.

The microcapsules may be microcapsules that allow diffusion of substances inward or outward through the microcapsules upon application of stimulus such as light or pressure, or may be heat-responsive microcapsules that allow diffusion of substances inward or outward through the microcapsules upon heat treatment (through increase in the substance permeability of the shell).

The diffusion of substances inward or outward through the microcapsules upon application of a stimulus is preferably irreversible from the viewpoints of preventing decrease in the color density during image formation and change in color balance of the image left under a high-temperature environment.

Accordingly, the shell of the microcapsules may have a function of increasing its substance permeability irreversibly, for example, by softening, decomposition, dissolution (into a surrounding material), or deformation caused by application of a stimulus such as heat treatment or irradiation of light.

The toner is not particularly limited if it has the functions above, and examples thereof include the toners described in JP-A No. 2003-330228. The following toner is preferably used from the viewpoint of increasing the amount of microcapsules in the toner and preventing uneven distribution of the microcapsules.

As the toner maintaining the color- generating or non-color-generating state when color-generation information is provided by light, it is preferable use a toner containing the first and second components which are separated from each other and which develop color through reaction with each other and a photocurable composition containing one of the first and second components, wherein the photocurable composition maintains the color-generating or non-color-generating state depending on whether the photocurable composition maintains the cured or uncured state when color-generation information is provided by light (hereinafter, the above toner is occasionally referred to as "F toner").

First, the mechanism of the color development of the F toner will be described.

The F toner has one or more continuous regions in a binder resin, called color-generating portions, that can maintain a state developing a particular color or a state not developing a particular color (i.e., non-color-generating state) after color-generation information is provided by light, as will be described below.

When there are multiple color-generating portions in the F toner, the multiple color-generating portions are disposed separately, so that the materials contained in the respective color-generating portions are not mixed with each other.

Thus, the F toner according to an aspect of the present invention has one or plural color-generating portions, which are continuous regions that are capable of maintaining a state at which color can be developed or a non-color-generating state. When color is developed, the color of each region is different. As shown in FIG. 4A, each color-generating portion 60 contains microcapsules 50 containing a coloring agent and a photocurable composition 58 surrounding the microcapsules 50. Thus, in the color-generating portion 60, the microcapsules 50 are dispersed in the photocurable composition 58.

Figure 4B:
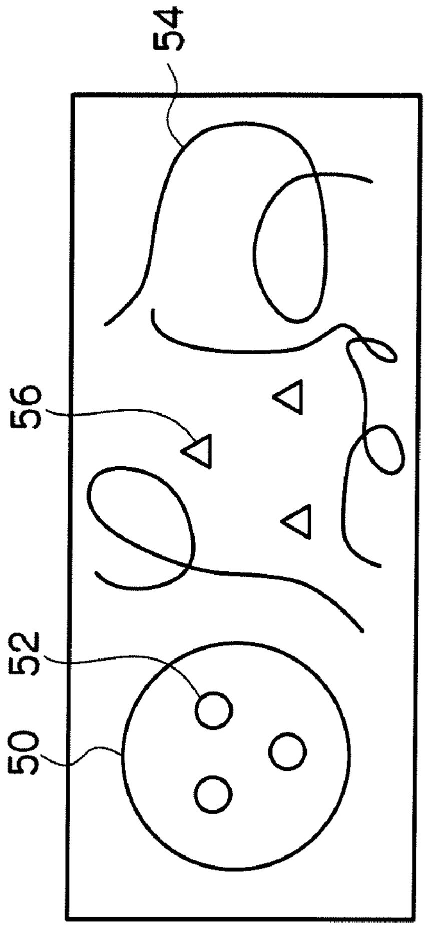
FIGS. 4A and 4B are schematic views showing a mechanism of color development of toner; and 4A is a view illustrating a color-generating portion and 4B is an expanded view thereof.
Figure 4A:
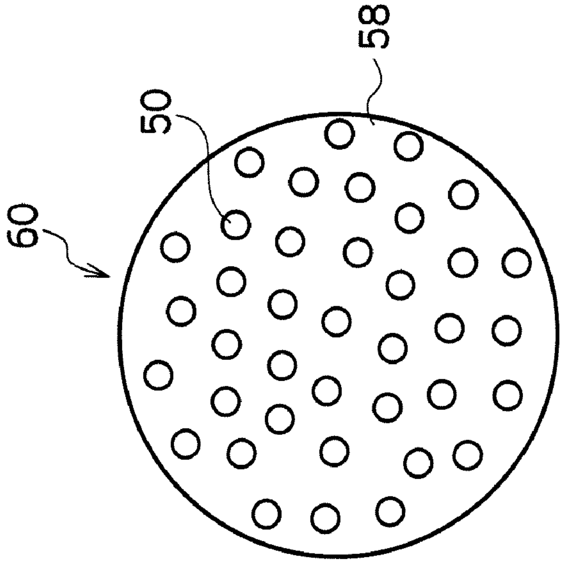

As shown in FIG. 4(B), which is an expanded view illustrating the color-generating portion 60, the color-generating portion 60 contains at least microcapsules 50, a coloring agent (first component) 52, a developer monomer having a polymerizable functional group (second component) 54 that causes color formation when it comes close to or in contact with the coloring agent 52, and a photopolymerization initiator 56.

The microcapsules 50 contain at least a coloring agent (first component) 52 inside. The photocurable composition 58 surrounding the microcapsules 50 contains a developer monomer (second component) 54 having a polymerizable functional group that cause color formation when it comes close to or in contact with the coloring agent (first component) 52, and a photopolymerization initiator 56.

The developer monomer 54 developing the color of a coloring agent 52 such as the leuco compound (electron-donating compound) may be an electron-accepting compound. The developer monomer 54 is generally a phenol compound and selected properly from the developers used, for example, in thermosensitive and pressure-sensitive papers.

The coloring agent 52 develops color in acid base reaction between the electron-donating coloring agent 52 and the electron-accepting developer monomer 54.

The photopolymerization initiator 56 used herein is a spectral sensitizing colorant which is sensitive to visible light and which, upon irradiation with visible light, generates a polymerizing radical that triggers polymerization of the developer monomer 54.

For example, a reaction accelerator for the photopolymerization initiator 56 may be used for allowing the polymerization reaction of the developer monomer 54 to a sufficient degree upon irradiation of light in three primary colors, R, G, or B. For example, when an ion complex between a spectral sensitizing colorant (cation) absorbing irradiated light and a boron compound (anion) is used, the spectral sensitizing colorant is photoexcited by light exposure, transferring an electron to the boron compound, thus generating a polymerizable radical and initiating polymerization.

By combined used of these materials, it is possible to allow the photosensitive color-generating portion 60 to attain a coloring recording sensitivity of approximately 0.1 to 0.2 $mJ/cm^2$.

The color-generating portion 60 in such a configuration contains a polymerized developer compound or an unpolymerized developer monomer 54, depending on whether the color-generating portion 60 has been irradiated with light that provides color-generation information to the color-generating portion 60.

When a color-generating portion containing unpolymerized developer monomer 54 is heated after the color-generation information is provided, the developer monomer 54 migrates and penetrates through the pore of the microcapsule 50 wall, and diffuses into the interior of the microcapsule. When the developer monomer 54 is diffused into the interior of the microcapsule 50, the coloring agent 52 develop color through an acid-base reaction between the coloring agent 52 (basic) and the developer monomer 54 (acidic).

On the other hand, if the developer compound is polymerized, the developer compound, when subjected to a coloring step such as heating, cannot penetrate the pore of the microcapsule 50 wall by diffusion because of the bulkiness of the polymerized compound; therefore, the developer compound cannot react with the coloring agent 52 in the microcapsule and coloration does not occur. As a result, the microcapsule 50 remains colorless. Thus, the color-generating portion 60 irradiated with light at a particular wavelength remains uncolored.

The entire surface is exposed to a white light source once again in a suitable stage after color development, thereby fixing the image reliably by polymerizing all residual unpolymerized developer monomers 54 and also, decolorizing the background color by decomposing the residual spectral sensitizing colorant. Although the color tone of a spectral sensitizing colorant of a photopolymerization initiator 56 for the visible light region remains consistently as the background color, a photodecolorization phenomenon of colorant/boron compounds may be used for decoloration of the spectral sensitizing colorant. That is, electron transfer from an photoexcited spectral sensitizing colorant to a boron compound generates a polymerizable radical, which initiates polymerization of monomer and also leads to decomposition of the colorant in reaction with an excited colorant radical and consequently to decoloration of the colorant.

In the F toner, the color-generating portions 60 different in the color to be developed (for example, developing respective colors, Y, M, and C) may be contained in one microcapsule in the state that respective developer monomers 54 do not interfere with the coloring agents other than the target coloring agent 52 (mutually separated state). When there are multiple color-generating portions containing coloring agents 52 that develop different colors from each other in the same toner, the multiple color-generating portions are separated from each other such that the materials contained in the respective color-generating portions are not mixed.

In the F toner, the space in the color-generating portion 60 other than the microcapsules 50 containing an electron-donating coloring agent 52 is filled with an electron-accepting developer monomer 54 and a photocurable composition 58. The light-receiving efficiency per particle is drastically higher than that of the toner disclosed in JP-A No. 2003-330228 because such a color-generating portion 60 is irradiated with light.

Advantageously, because the color-generation information providing mechanism is not a reversible reaction as described above, there is no restriction on the time that elapses before coloration occurs by heating. As a result, it is possible to print in the low speed range, i.e., to cope with a wider speed range; and additionally there is a higher degree of freedom in designing the location, for example, of the fixing unit for developing color by heating.

The F toner for use in an aspect of the present invention will be described below in more detail.

Examples of the F toner for use in an aspect of the present invention include the following three toners: The F toner may be a toner containing i) first and second components that develop color through reaction therebetween, ii) a photocurable composition, and iii) microcapsules dispersed in the photocurable composition, wherein the first component is contained in the microcapsules and the second component is contained in the photocurable composition (first aspect), ii) a toner containing i) first and second components that develop color through reaction therebetween and ii) microcapsules containing a photocurable composition, wherein the first component is contained outside the microcapsule and the second component is contained in the photocurable composition (second aspect), or iii) a toner containing i) first and second components that develop color through reaction therebetween, ii) first microcapsules containing the first component, and iii) second microcapsules containing a photocurable composition containing the dispersed second component (third aspect).

Among the three aspects, the first aspect is preferable, from the viewpoints of the stability before color-generation information is provided by light, controllability of color development, and others. In the following description of the toner, the toner in the first aspect will be basically described in detail, but the configuration, materials, production method, and others of the toner in the first aspect described below are also usable in and applicable to the toners in the second and third aspects.

The F toner described above in which a combination of heat-responsive microcapsules and a photocurable composition is used is particularly preferably either of the following 2 types.

(1) Diffusion of the second component contained in the uncured photocurable composition is inhibited upon heat treatment of the toner if the photocurable composition is in the uncured state, while diffusion of the second component contained in the photocurable composition is accelerated upon heat treatment of the toner after the photocurable composition is cured by irradiation of the color-generation information providing light (toner of this type will be occasionally referred to as "photocoloring toner" hereinafter).

(2) Diffusion of the second component contained in the uncured photocurable composition is accelerated upon heat treatment of the toner if the photocurable composition is in the uncured state (i.e., the second component is in the unpolymerized state), while diffusion of the second component contained in the photocurable composition is inhibited upon heat treatment of the toner after the photocurable composition is cured by irradiation of the color-generation information providing light (i.e., after polymerization of the second component) (toner of this type will be occasionally referred to as "non-photocoloring toner" hereinafter).

A major difference between the photocoloring toner and the non-photocoloring toner lies in the material constituting the photocurable composition, and in the photocoloring toner, at least a (non-photopolymerizable) second component and a photopolymerizable compound are contained in the photopolymerizable composition, while in the non-photocoloring toner, at least a second component having a photopolymerizable group in its molecule is contained in the photopolymerizable composition.

In the photocurable composition used in the photocoloring toner and the non-photocoloring toner, a photopolymerization initiator is particularly preferably contained, and if necessary other various materials may be contained.

The photopolymerizable compound and the second component used in the photocoloring toner are the following materials: they have interaction therebetween in an uncured state of the photocurable composition, the second component in the photocurable composition is prevented from being diffused, and the interaction between the two in a cured state of the photocurable composition by irradiation of color-generation information providing light (after polymerization of the photopolymerizable compound) is reduced to facilitate the diffusion of the second component in the photocurable composition.

Accordingly, the second component in the photocoloring toner before a step of coloring the toner by heat treatment is previously irradiated with a light of wavelength capable of curing the photocurable composition as provided color-generation information, thereby facilitating the diffusion of the second component contained in the photocurable composition. Consequently, the first component in the microcapsule and the second component in the photocurable composition will, upon heat treatment, react with each other (color-generating reaction), for example due to dissolution of the microcapsule shell.

On the other hand, the second component, when heat-treated as such without irradiating a light of wavelength capable of curing the photocurable composition as provided color-generation information, is trapped by the photopolymerizable compound and cannot contact with the first component in the microcapsule, and thus the reaction between the first component and the second component (color-generating reaction) does not occur.

As described above, the coloration of the photocoloring toner can be controlled by controlling the reaction between the first and second components (color-generating reaction) through heat treatment with or without prior irradiation of light having a wavelength in a particular wavelength region capable of curing the photocurable composition which light provides color-generation information.

Because the second component itself in the non-photocoloring toner is photopolymerizable, the second component contained in the photocurable composition may easily diffuse even when light that provides color-generation information is irradiated as long as the wavelength of the light is not in a particular wavelength region that allows curing of the photocurable composition; consequently, the first component in the microcapsule and the second component in the photocurable composition, when heat-treated in the state, react with each other (color-generating reaction), for example due to dissolution of the microcapsule shell.

In contrast, if light having a wavelength in a particular wavelength region that cures the photocurable composition is irradiated before heat treatment, the second component contained in the photocurable composition polymerizes, so that diffusion of the second component contained in the photocurable composition is inhibited. Thus, the second component, even if heat-treated, cannot come in contact with the first component in the microcapsule, so that the reaction between the first and second components (color-generating reaction) does not occur.

As described above, the coloration of the non-photocoloring toner can be controlled by controlling the reaction between the first and second components (color-generating reaction) through heat treatment with or without prior irradiation of light having a wavelength in a particular wavelength region capable of curing the photocurable composition which light provides color-generation information.

Hereinafter, an exemplary structure of the F toner in which the photocurable composition above and microcapsules dispersed in the photocurable composition are contained will be described more in detail.

In this case, the toner may contain a photocurable composition and only one color-generating portion containing microcapsules dispersed in the photocurable composition, but alternatively may contain two or more color-generating portions.

As described above, the term "color-generating portion" above means a continuous region that can develop a particular color when an external stimulus is applied.

When the toner contains two or more color-generating portions, only one kind of color-generating portion capable of developing the same color may be contained in a toner particle. In an exemplary embodiment, two or more color-generating portions developing different colors are contained in a single toner particle. The number of the colors developed by one toner particle is restricted to one in the former case, but is two or more in the latter case.

An example of the combination of the two or more color-generating portions capable of developing different colors from each other is a combination of a yellow color-generating portion capable of developing yellow color, a magenta color-generating portion capable of developing magenta color, and a cyan color-generating portion capable of developing cyan color.

In this case, for example, when only one kind of color-generating portion develops color upon application of an external stimulus, the toner develops a color, i.e. one of yellow, magenta, or cyan; and when two kinds of color-generating portions develop color, the toner can develop a color which is a combination of the colors of the two kinds of color-generating portions; therefore, one toner particle can assume various colors.

It is possible to control the color developed by the toner containing two or more color-generating portions developing colors different from each other, by making different the kinds and the combination of the first and second components contained in each kind of color-generating portion and also by making different the wavelength of the light used for curing the photocurable composition contained in each kind of color-generating portion.

Because the wavelength of the light needed for curing the photocurable composition contained in the color-generating portion, in this case, varies depending on the kind of the color-generating portion, multiple kinds of lights different in wavelength may be used that provides color-generation information, each light corresponding to each kind of the color-generating portion (specifically, to the photocurable composition in each color-generating portion).

In order to make different the wavelength of the light needed for curing the photocurable composition contained in each color-generating portion, a photopolymerization initiator sensitive to light having a different wavelength may be contained in the photocurable composition of each color-generating portion.

For example, when the toner contains three kinds of color-generating portions developing colors in yellow, magenta, and cyan, and the photocurable compositions contained in the three kinds of color-generating portions cure to the highest degree under the same light amount at a wavelength of respectively 405 nm, 532 nm or 657 nm, the toner can develop a desired color by changing the wavelength of the irradiation light. The wavelength of the light irradiated to the toner may be selected from within the visible range or the ultraviolet range.

The F toner may contain a base material containing, as a primary component, a binder resin similar to those used in conventional toners using a coloring agent such as pigment. In this case, each of the two or more color-generating portions may be dispersed as particulate capsules in the base material (hereinafter, a capsular color-generating portion will be referred to as "photo- and thermo-sensitive capsule" in some cases). A releasing agent and various additives may also be contained in the base material, similarly to conventional toners containing a coloring agent such as pigment.

The photo- and thermo-sensitive capsules have a core region containing microcapsules and a photocurable composition and a shell encapsulating the core region. The shell is not particularly limited as long as the shell can hold the microcapsules and the photocurable composition in the photo- and thermo-sensitive capsule stably without leakage to the exterior of the capsule during the toner production process described below or during storage of the toner.

However, the photo- and thermo-sensitive capsule may contain water-insoluble materials as the primary components, such as a releasing material and a binder resin consisting of a water-insoluble resin so as to prevent of leakage of the second component to the exterior matrix outside the photo- and thermo-sensitive capsule through the shell, or so as to prevent inflow of the second component originally contained in another photo- and thermo-sensitive capsule that can develop a different color through the shell during the toner production process described below.

Hereinafter, the toner components used in the F toner and the materials and the method used in adjusting the toner components will be described more in detail. In this case, the toner contains at least the first component, the second component, microcapsules containing the first component, and a photocurable composition containing the second component. The photocurable composition may contain a photopolymerization initiator, and may also contain various assistants and others. The first component may be present in the microcapsules (core region) in the solid state or in combination with a solvent.

In the non-photocoloring toner above, an electron-donating colorless dye or diazonium salt compound, for example, is used as the first component, and a photopolymerizable group-containing electron-accepting compound or photopolymerizable group-containing coupler compound, or the like may be used as the second component. In the photocoloring toner, an electron-donating colorless dye may be used as the first component; an electron-accepting compound (hereinafter, referred to as "electron-accepting developer" or "developer") may be used as the second component; and a polymerizable compound having an ethylenically unsaturated bond may be used as the photopolymerizable compound.

In addition to the materials listed above, various materials similar to the materials for conventional toners using a coloring agent, such as binder resin, a releasing agent, an internal additive, and an external additive, may be added as needed. Hereinafter, each material will be described more in detail.

—First and Second Components—

Examples of the combinations of the first and second components include the following combinations (a) to (r) (in the following examples, the former compound represents the first component and the latter compound represents the second component).

(a) Combination of an electron-donating colorless dye and an electron-accepting compound.

(b) Combination of a diazonium salt compound and a coupling component (hereinafter, occasionally referred to as "coupler compound").

(c) Combination of an organic acid metal salt such as silver behenate or silver stearate and a reducing agent such as protocatechin acid, spiroindane, or hydroquinone.

(d) Combination of a long-chain fatty acid iron salt such as ferric stearate or ferric myristate and a phenol compound such as tannic acid, gallic acid, or ammonium salicylate.

(e) Combination of i) an organic acid heavy metal salt such as nickel, cobalt, lead, copper, iron, mercury, or silver salt of acetic acid, stearic acid, palmitic acid, or the like and ii) an alkali metal or alkali-earth metal sulfide such as calcium sulfide, strontium sulfide, or potassium sulfide, or combination of i) such an organic acid heavy metal salt and ii) an organic chelating agent such as s-diphenyl carbazide or diphenyl carbazone.

(f) Combination of i) a heavy metal sulfate salt such as silver, lead, mercury, or sodium sulfate and ii) a sulfur compound such as sodium tetrathionate, sodium thiosulfate, or thiourea.

(g) Combination of an aliphatic ferric salt such as ferric stearate and an aromatic polyhydroxy compound such as 3,4-hydroxytetraphenyl methane.

(h) Combination of an organic acid metal salt such as silver oxalate or mercury oxalate and an organic polyhydroxy compound such as polyhydroxyalcohol, glycerin, or glycol.

(i) Combination of a fatty acid ferric salt such as ferric pelargonate or ferric laurate and a thiocesyl or isothiocesyl carbamide derivative.

(j) Combination of an organic acid lead salt such as lead caproate, lead pelargonate, or lead behenate and a thiourea derivative such as ethylenethiourea or N-dodecylthiourea.

(k) Combination of a higher fatty acid heavy metal salt such as ferric stearate or copper stearate and zinc dialkyldithiocarbamate.

(l) Combination forming an oxazine dye such as the combination of resorcin and a nitroso compound.

(m) Combination of a formazan compound and a reducing agent and/or a metal salt.

(n) Combination of a protected colorant (or leuco colorant) precursor and a deprotecting agent.

(o) Combination of an oxidative coloring agent and an oxidizing agent.

(p) Combination of a phthalonitrile compound and a diiminoisoindoline compound (combination producing by phthalocyanine).

(q) Combination of an isocyanate compound and a diiminoisoindoline compound (combination forming a coloring pigment).

(r) Combination of a pigment precursor and an acid or base (combination forming a pigment).

Among the first components listed above, an electron-donating colorless dye, which is substantially colorless, or a diazonium salt compound is preferable.

Any one of known dyes may be used as the electron-donating colorless dye as long as the dye reacts with the second component to develop color. Specific examples thereof include phthalide compounds, fluorane compounds, phenothiazine compounds, indolylphthalide compounds, leucoauramine compounds, rhodamine lactam compounds, triphenylmethane compounds, triazene compounds, spiropyran compounds, pyridines, pyrazine compounds, fluorene compounds, and others.

In the case of the non-photocoloring toner, the second component that can be used may be any compound which is a substantially colorless compound which has a photopolymerizable group and a moiety capable of reacting with the first component to develop color, and which has a function of reacting with the first component, such as an electron-accepting compound having a photopolymerizable group or a coupler compound having a photopolymerizable group, to develop color and a function of polymerizing and curing in reaction to light.

The electron-accepting compound having a photopolymerizable group, which is a compound having an electron-accepting group and a photopolymerizable group in the same molecule, is not particularly limited as long as i) the compound has a photopolymerizable group which causes photopolymerization and curing, and ii) the compound reacts with an electron-donating colorless dye as an example of the first component to develop color.

In the case of the photocoloring toner, the electron-accepting developer as the second component includes phenol derivatives, sulfur-containing phenol derivatives, organic carboxylic acid derivatives (for example, salicylic acid, stearic acid, resorcin acid, etc.) and metal salts thereof, sulfonic acid derivatives, urea or thiourea derivatives, acid clay, bentonite, novolac resins, metal-treated novolac resins, and metal complexes.

In the photocoloring toner, a polymerizable compound having an ethylenically unsaturated bond is used as the photopolymerizable compound, and this compound is a polymerizable compound having at least one ethylenically unsaturated double bond in its molecule, such as acrylic acid and a salt thereof, an acrylate or acrylamide.

Hereinafter, the photopolymerization initiator will be described. When irradiated with light that provides color-generation information, the photopolymerization initiator generates radicals, which initiate and accelerate the polymerization reaction in the photocurable composition. The photocurable composition cures through this polymerization reaction.

The photopolymerization initiator may be appropriately selected from known photopolymerization initiators, and may be a photopolymerization initiator containing a spectral sensitizing compound having the maximum absorption wavelength of 300 to 1000 nm and a compound interacting with the spectral sensitizing compound.

However, if the compound interacting with the spectral sensitizing compound used is a compound having both a colorant moiety having the maximum absorption wavelength of 300 to 1000 nm and a borate moiety in its structure, the spectral sensitizing colorant is not essential.

One compound or two or more compounds selected from known compounds that is capable of initiating a photopolymerization reaction with the photopolymerizable group in the second component may be used as the compound interacting with the spectral sensitizing compound.

When this compound is present in combination with the spectral sensitizing compound, the sensitivity may be improved and control of the radical generation may be achieved by using any light source in the ultraviolet to infrared region. This is because radicals are generate at high efficiency upon irradiation of light within the spectroscopic absorption wavelength region of the spectral sensitizing compound with high sensitivity.

The "compound interacting with a spectral sensitizing compound" is preferably an organic borate salt compound, a benzoin ether, a S-triazine derivative having a trihalogen-substituted methyl group, an organic peroxide or an azinium salt compound, more preferably an organic borate salt compound. It is possible to effectively generate radicals locally in the irradiated area and to improve the sensitivity, by combined use of the "compound interacting with a spectral sensitizing compound" with the spectral sensitizing compound.

A reducing agent such as an oxygen scavenger or an active hydrogen donor chain-transfer agent, and other compounds accelerating polymerization by chain transfer may be added to the photocurable composition in order to accelerate the polymerization reaction.

Examples of the oxygen scavenger include phosphines, phosphonates, phosphites, primary silver salts, and other compounds easily oxidized with oxygen. Specific examples thereof include N-phenylglycine, trimethylbarbituric acid, N,N-dimethyl-2,6-diisopropylaniline, and N,N,N-2,4,6-pentamethylanilineic acid. In addition, thiols, thioketones, trihalomethyl compounds, Rofn dimer compounds, iodonium salts, sulfonium salts, azinium salts, organic peroxide, azides and the like are also useful as the polymerization accelerators.

The material that can be used as the microcapsule wall is added to inside the oil droplet and/or outside the oil droplet. Examples of the materials for the microcapsule wall include polyurethane, polyurea, polyamide, polyester, polycarbonate, urea-formaldehyde resins, melamine resins, polystyrene, styrene-methacrylate copolymers, styrene-acrylate copolymers, and the like. Among them, polyurethane, polyurea, polyamide, polyester, and polycarbonate are preferable, and polyurethane and polyurea are more preferable. The polymer substances above may be used in combination of two or more.

The first component such as an electron-donating colorless dye or a diazonium salt compound is encapsulated in microcapsules in the F toner.

Any known method may be used for the encapsulation. Examples thereof include the methods of using coacervation of a hydrophilic wall-forming material described in U.S. Pat. Nos. 2,800,457 and 2,800,0458; the interfacial polymerization methods described in U.S. Pat. No. 3,287,154, British Patent No. 990443, Japanese Patent Publication (JP-B) Nos. 38-19574, 42-446, and 42-771, and others; the polymer precipitation methods described in U.S. Pat. Nos. 3,418,250 and 3,660,304; the method using an isocyanate polyol wall material described in U.S. Pat. No. 3,796,669; the method of using an isocyanate wall material described in U.S. Pat. No. 3,914,511; the methods of using a urea-formaldehyde or urea formaldehyde-resorcinol-based wall-forming material described in U.S. Pat. Nos. 4,001,140, 4,087,376, and 4,089,802; the method of using a wall-forming material such as a melamine-formaldehyde resin or hydroxypropylcellulose described in U.S. Pat. No. 4,025,455; the in-situ methods of monomer polymerization described in JP-B No. 36-9168 and JP-A No. 51-9079; the electrolytic dispersion cooling methods described in British Patent Nos. 952807 and 965074; the spray drying methods described in U.S. Pat. No. 3,111,407 and British Patent No. 930422; the methods described in JP-B No. 7-73069, and JP-A Nos. 4-101885 and 9-263057; and the like.

The volume-average particle diameter of the microcapsules is preferably controlled in the range of 0.1 to 3.0 μm, more preferably in the range of 0.3 to 1.0 μm.

The photo- and thermo-sensitive capsule may contain a binder, and the same is true for the toner having one color-generating portion.

Examples of the binders include binders similar to those used for emulsification or dispersion of the photocurable composition; the water-soluble polymers used for encapsulation of the first reactive substance; solvent soluble polymers such as polystyrene, polyvinylformal, polyvinylbutyral, acrylic resins such as polymethyl acrylate, polybutyl acrylate, polymethyl methacrylate, polybutyl methacrylate and copolymers thereof, phenol resins, styrene-butadiene resins, ethylcellulose, epoxy resins, and urethane resin; or the latexes of these polymers may also be used. Among them, gelatin and polyvinyl alcohol are preferable. The binder resins described below may also be used as the binder.

The F toner may contain a binder resin used in conventional toners. In the toner having a structure containing photo- and thermo-sensitive capsules dispersed in a base material, the binder resin may be used, for example, as the primary component for the base material or the material for the shell of the photo- and thermo-sensitive capsule. However, use of the binder resin is not limited thereto.

The binder resin is not particularly limited, and any known crystalline or amorphous resin material may be used. In particular, a crystalline polyester resin showing a sharp melting property is useful for giving low-temperature fixability. Examples of the amorphous polymers (noncrystalline resins) include known resin materials such as styrene acrylic resin and polyester resin, and noncrystalline polyester resins are particularly preferable.

In addition, the F toner may contain components other than those listed above. The other components are not particularly limited and can be selected appropriately according to applications, and examples thereof include various known additives used in conventional toners such as releasing agents, inorganic fine particles, organic fine particles, and antistatic agents.

The first and second components in the F toner may have previously been colored before color development, but are preferably substantially colorless.

Hereinafter, the method of producing the F toner will be described briefly.

The F toner may be prepared by a known wet production method such as emulsion aggregation coalescence method. The wet production method may be used for preparation of a toner having a structure containing first and second components that develop color in reaction therebetween, a photocurable composition, and microcapsules dispersed in the photocurable composition wherein the first component is contained in the microcapsules and the second component is contained in the photocurable composition.

The microcapsules used in the toner having such a structure may be particularly preferably a heat-responsive microcapsules, but may alternatively be microcapsules sensitive to other stimuli such as light.

Any one of known wet production methods may be used for production of the toner. Among the wet production methods, use of the emulsion aggregation coalescence method is particularly preferable because it may reduce the maximum processing temperature and may produce toners having various structures easily.

When compared with conventional toners containing a pigment and a binder resin as primary components, the particles of the toner having such a structure, which includes a large amount of photocurable compositions containing low-molecular weight components as primary components, often have insufficient strength after granulation of the toner; use of the aggregation coalescence method is advantageous also from this point because the aggregation coalescence method does not involve application of high shearing force.

In general, the aggregation coalescence method includes preparing dispersion liquids of various materials for the toner, forming aggregate particles in a raw material dispersion liquid obtained by mixing two or more dispersion liquids, and coalescing the aggregate particles formed in the raw material dispersion liquid, and additionally as needed, forming a coating layer by adhering components for forming a coating layer on the surface of the aggregate particles between the forming of the aggregate particles and coalescing of the aggregate particles. Although the kinds and combination of various dispersion liquids used as raw materials may be different in production of the F toner, the toner may be prepared through an appropriate combination of the forming of the aggregate particles and coalescing of the aggregate particles, and, optionally, forming of a coating layer.

For example, in the case of a toner having a structure containing photo- and thermo-sensitive capsules dispersed in a resin, one or more photo- and thermo-sensitive capsule dispersion liquids capable of developing different colors from each other are prepared through a first aggregation process (a1) of forming first aggregate particles in a raw material dispersion liquid including i) a microcapsule dispersion liquid containing dispersed microcapsules containing the first component and ii) a photocurable composition dispersion liquid containing dispersed photocurable composition containing the second component, an adhesion process (b1) of adding a first resin particle dispersion liquid containing dispersed resin particles to the raw material dispersion liquid containing the first aggregate particles formed to adhere the resin particles on the surface of the aggregate particles, and a first coalescing process (c1) of preparing first coalescence particles (photo- and thermo-sensitive capsules) by heating the raw material dispersion liquid containing the aggregate particles having the resin particles adhered on the surface to cause coalescence.

A toner having a structure in which photo- and thermo-sensitive capsules are dispersed is then prepared through a second aggregation process (d1) of forming second aggregate particles in a mixed solution of the one or more photo- and thermo-sensitive capsule dispersion liquids and a second resin particle dispersion liquid containing dispersed resin particles and a second coalescing process (e1) of producing second coalescence particles by heating the mixed solution containing the second aggregate particles.

In an exemplary embodiment, two or more kinds of the photo- and thermo-sensitive capsule dispersion liquids are used in the second aggregation process. The photo- and thermo-sensitive capsules obtained through processes (a1) to (c1) may be used as a toner (i.e., toner containing only one color-generating portion) as it is.

An exemplary method for producing a toner containing only one color-generating portion may include, in place of the above adhesion process, a first adhesion process of adding a releasing agent dispersion liquid containing a dispersed releasing agent to a raw material dispersion liquid containing the first aggregate particles to adhere the releasing agent on the aggregate particle surface, and a second adhesion process of adhering resin particles on the surface of the aggregate particles having the releasing agent adhered on their surfaces by adding a first resin particle dispersion liquid containing dispersed resin particles to the raw material dispersion liquid after the first adhesion process.

Toners, including the F toner described above, may be used regardless of the constituent materials, the structure of toner, coloring mechanism, and others, as long as the toner can be controlled to maintain the coloring or non-coloring state by irradiation of light (or non-irradiation of light).

Hereinafter, preferable characteristics of the toner (F toner) will be described.

The volume-average particle diameter of the toner is not particularly limited, and may be appropriately adjusted according to the structure of toner and the kinds and the number of the color-generating portions contained in the toner.

However, when 2 to 4 kinds of color-generating portions capable of developing different colors from each other (for example, three kinds of color-generating portions capable of developing colors in yellow, cyan, and magenta, respectively) are contained in the toner, the volume-average particle diameter is preferably in the range below, depending on each toner structure.

For example, when the toner has a structure in which photo- and thermo-sensitive capsules (color-generating portions) are dispersed in a resin, the volume-average particle diameter of the toner is preferably in the range of 5 to 40 μm and more preferably in the range of 10 to 20 μm. The volume-average particle diameter of the photo- and thermo-sensitive capsules contained in the toner having such a particle diameter is preferably in the range of 1 to 5 μm and more preferably in the range of 1 to 3 μm.

When the volume-average particle diameter of the toner is less than 5 μm, there may be cases where color reproducibility and image density is worsened due to decrease in the amount of coloring components in the toner. When the volume-average particle diameter of the toner is more than 40 μm, there may be cases where uneven glossiness of image surface is observed due to increase in image surface irregularity, and/or the image quality is deteriorated.

The toner in which multiple photo- and thermo-sensitive capsules are dispersed tends to have a particle diameter larger than that of the conventional small-diameter toners (whose volume-average particle diameter is approximately 5 to 10 μm) using a coloring agent. Even so, the toner containing the dispersed multiple photo- and thermo-sensitive capsules gives an image higher in definition because the image definition is determined not by the particle diameter of toner but by the particle diameter of the photo- and thermo-sensitive capsules. In addition, the toner is superior in powder flowability and thus, sufficient flowable is ensured even when the amount of external additives is small, and developability and cleaning efficiency may also be improved.

On the other hand, the particle diameter of a toner having only one color-generating portion may be reduced more easily than the toner described above, and the volume-average particle diameter is preferably in the range of 3 to 8 μm and more preferably in the range of 4 to 7 μm. An excessively smaller volume-average particle diameter of less than 3 μm may lead to insufficient powder flowability or insufficient durability. Alternatively, a volume-average particle diameter of more than 8 μm may hinder formation of a high-definition image.

The toner for use in an aspect of the present invention preferably has a volume-average particle distribution index GSDv of 1.30 or less and a ratio of the volume-average particle distribution index GSDv to a number-average particle diameter distribution index GSDp (GSDv/GSDp) of 0.95 or more.

More preferably, the volume-average particle distribution index GSDv is 1.25 or less, and the ratio of the volume-average particle distribution index GSDv to the number-average particle diameter distribution index GSDp (GSDv/GSDp) is still more preferably 0.97 or more.

A volume distribution index GSDv of more than 1.30 sometimes leads to decrease in image resolution, while a ratio of volume-average particle distribution index GSDv to number-average particle diameter distribution index GSDp (GSDv/GSDp) of less than 0.95 sometimes leads to deterioration in the charging properties of toner and also to image defects caused, for example, by scattering of toner or toner fog.

The volume-average particle diameter, the volume-average particle distribution index GSDv, and the number-average particle diameter distribution index GSDp of the toner are determined in the following manner.

A cumulative volume distribution curve and a cumulative number distribution curve are drawn from the side of the smaller particle size, respectively, for each particle size range (channel) as a result of division of the particle size distribution measured by using a measuring instrument, for example, a Coulter Multisizer II (trade name, manufactured by Beckman Coulter) or the like, and the particle diameter providing 16% cumulative is defined as volume D16v and number D16p; that providing 50% cumulative being defined as volume D50v and number D50p; and that providing 84% cumulative being defined as volume D84v and number D84p. Using these values, the volume-average particle size distribution index (GSDv) is calculated as $(D84v/D16v)^{1/2}$, and the number-average particle size distribution index (GSDp) is calculated as $(D84p/D16p)^{1/2}$. The volume average particle size distribution index (GSDv) and the number-average particle size distribution index ($GSD_p$) can be calculated with the formulae above.

Alternatively, the volume-average particle diameter of the microcapsules and the photo- and thermo-sensitive capsules may be determined, for example by using a laser-diffraction particle size distribution analyzer (LA-700, manufactured by Horiba, Ltd.).

Preferably, the toner has a shape factor SF1 represented by the following Formula (1) in the range of 110 to 130.

$$SF1=(ML^2/A)\times(\pi/4)\times100 \quad (1)$$

wherein ML represents the maximum length (μm) of toner; and A represents the projection area ($\mu m^2$) of toner).

A toner having a shape factor SF1 of less than 110 tends to remain on the photoreceptor in the transferring process in the image formation, in which case removal of the residual toner is necessary, and the cleanability at cleaning of the residual toner with a blade is easily deteriorated, whereby image defects are generated depending on cases.

On the other hand, a toner having a shape factor SF1 of more than 130, when used as a developer, is occasionally broken by collision with the carrier in the developing device, which in turn leads to deterioration in charging properties by increase in the amount of fine powder and contamination of the photoreceptor with the releasing agent component exposed on the toner surface, and also to problems caused by the fine powder such as increase in the fog.

The shape factor SF1 can be determined as follows. First, the optical microscope image of the toner particles scattered on a slide glass was taken into a Luzex image-analyzer (FT, manufactured by Nireco Corporation) through a video camera, and for 50 or more toner particles, the maximum length (ML) and the projected area (A) were measured. Then, the square of the maximum length and projection area are calculated for each toner, and the shape factor SF1 is determined according to the formula (1) above The toner may be used as it is as a single-component developer, but is preferably used as a toner for two-component developer consisting of a carrier and the toner.

For enabling one kind of developer to form a color image, the developer may be (1) a developer having a toner containing two or more kinds of color-generating portions containing a photocurable composition and microcapsules dispersed in the photocurable composition wherein the two or more kinds of color-generating portions contained in the toner develop different colors from each other, or (2) a developer containing two or more toners each containing a color-generating portion containing a photocurable composition and microcapsules dispersed in the photocurable composition, the toners being mixed with each other and the color-generating portions of the two or more toner being capable of developing different colors from each other.

For example, in the case of the developer of the former type, the toner may contain three kinds of color-generating portions, that is, a yellow color-generating portion capable of developing yellow color, a magenta color-generating portion capable of developing magenta color, and a cyan color-generating portion capable of developing cyan color, while the developer of the latter type may contain a yellow color-generating toner whose color-generating portion can develop yellow color, a magenta color-generating toner whose color-generating portion can develop magenta color, and a cyan color-generating toner whose color-generating portion can develop cyan color, the toners being mixed with each other.

The carrier that can be used in the two-component developer may have a core material whose surface is coated with a resin. The core material of the carrier is not particularly limited as long as it satisfies the above-mentioned condition. Examples thereof include magnetic metals such as iron, steel, nickel, and cobalt; alloys thereof with manganese, chromium, a rare-earth metal, or the like; and magnetic oxides such as ferrite and magnetite. Ferrite is preferable from the viewpoint of core material surface property and core material resistance; and the alloys thereof with manganese, lithium, strontium, magnesium, or the like are more preferable.

The resin for coating the core material surface is not particularly limited if it can be used as a matrix resin, and may be selected appropriately in accordance with the purpose.

The blending ratio of the toner according to an aspect of the present invention to the carrier, toner: carrier (by weight), in the two-component developer is preferably in the range of approximately 1:100 to 30:100 and more preferably in the range of approximately 3:100 to 20:100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLE

The following tests are performed to confirm the advantages of the embodiments above.

In the Examples below, "parts" and "%" refer to "parts by weight" and "% by weight" respectively.

(Preparation of Toner)

First, toners used in the Examples below are described. In preparation of toner below, preparation of photocurable composition dispersion liquids and preparation of a series of toners using the same are conducted in the dark.

A. Non-Photocoloring Toner (Preparation of Microcapsule Dispersion Liquid)

—Microcapsule Dispersion Liquid (1)—

8.9 parts by weight of an electron-donating colorless dye (1) capable of developing yellow color is dissolved in 16.9 parts by weight of ethyl acetate, and 20 parts by weight of a capsular wall material (trade name: TAKENATE D-110N, manufactured by Takeda Pharmaceutical Company Limited.) and 2 parts by weight of another capsular wall material (trade name: MILLIONATE MR200, manufactured by Nippon Polyurethane Industry Co., Ltd.) are added thereto.

The resulting solution is added to a mixed solution containing 42 parts by weight of 8 wt % phthalated gelatin, 14 parts by weight of water, and 1.4 parts by weight of a 10 wt % sodium dodecylbenzenesulfonate solution, and the mixture is emulsified and dispersed at a temperature of 20° C., to give an emulsion liquid. Then, 72 parts by weight of an aqueous 2.9% tetraethylenepentamine solution is added to the emulsion liquid obtained, and the mixture is heated to 60° C. while stirred for 2 hours, to give a microcapsule dispersion liquid (1). The microcapsules contained in the microcapsule dispersion liquid (1) have an average particle diameter of 0.5 μm and contain an electron-donating colorless dye (1) in the core region.

The glass transition temperature of the material constituting the shell of the microcapsules contained in the microcapsule dispersion liquid (1) (material prepared in reaction of TAKENATE D-110N and MILLIONATE MR200 under a condition almost the same as that described above) is 100° C.

—Microcapsule Dispersion Liquid (2)—

A microcapsule dispersion liquid (2) is prepared in the same manner as the preparation of the microcapsule dispersion liquid (1) except that the electron-donating colorless dye (1) is replaced with an electron-donating colorless dye (2). The average particle diameter of the microcapsules in the dispersion liquid is 0.5 μm.

—Microcapsule Dispersion Liquid (3)—

A microcapsule dispersion liquid (3) is prepared in the same manner as the preparation of the microcapsule dispersion liquid (1) except that the electron-donating colorless dye (1) is replaced with an electron-donating colorless dye (3). The average particle diameter of the microcapsules in the dispersion liquid is 0.5 μm.

The chemical structures of the electron-donating colorless dyes (1) to (3) used in the preparation of the microcapsule dispersion liquids are shown below.

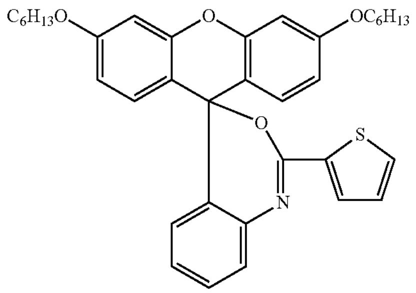

Electron-donating colorless dye (1)

-continued

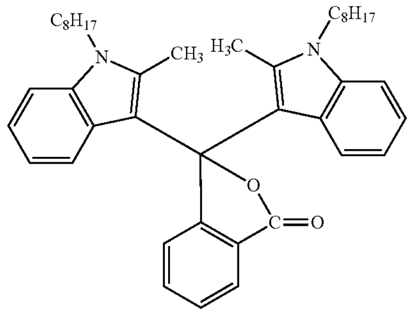

Electron-donating colorless dye (2)

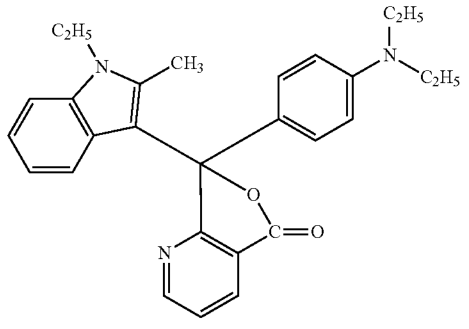

Electron-donating colorless dye (3)

(Photocurable Composition Dispersion Liquid)

—Preparation of Photocurable Composition Dispersion Liquid (1)—

100.0 parts by weight of a mixture of polymerizable group-containing electron-accepting compounds (1) and (2) (blending ratio: 50:50) and 0.1 part by weight of a thermal polymerization inhibitor (ALI) are dissolved in 125.0 parts by weight of isopropyl acetate (solubility in water: approximately 4.3%) at 42° C., to give a mixture solution I.

18.0 parts by weight of hexaarylbiimidazole (1) [2'2'-bis (2-chlorophenyl)-4,4',5,5'-tetraphenyl-1,2'-biimidazole], 0.5 part by weight of a nonionic organic dye, and 6.0 parts by weight of an organic boron compound are added to and dissolved in the mixture solution I at 42° C. to give a mixture solution II.

The mixture solution II is added to a mixture solution of 300.1 parts by weight of an aqueous 8% gelatin solution and 17.4 parts by weight of an aqueous 10 % surfactant (1) solution. Then, the resultant mixture is emulsified in a homogenizer (manufactured by Nippon Seiki Co., Ltd.)) at a rotational speed of 10,000 rpm for 5 minutes, and then the solvent is removed at 40° C. over 3 hours, to give a photocurable composition dispersion liquid (1) having a solid content of 30%.

The structural formulae of the polymerizable group-containing electron-accepting compound (1), the polymerizable group-containing electron-accepting compound (2), the thermal polymerization inhibitor (ALI), the hexaarylbiimidazole (1), the surfactant (1), the nonionic organic dye, and the organic boron compound used in the preparation of the photocurable composition dispersion liquid (1) are shown below.

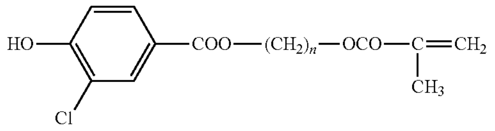

Polymerizable electron-accepting compound
n = 5 (1)
n = 6 (2)

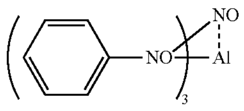

ALI

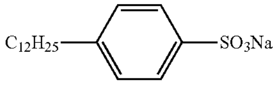

Surfactant (1)

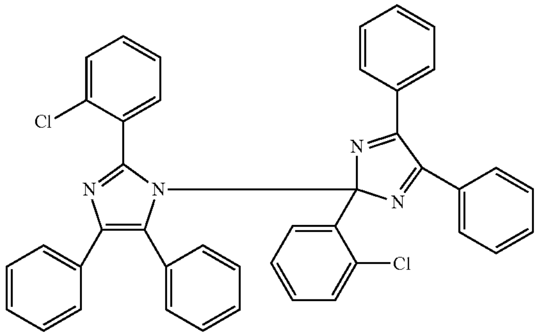

Hexaarylbiimidazole (1)

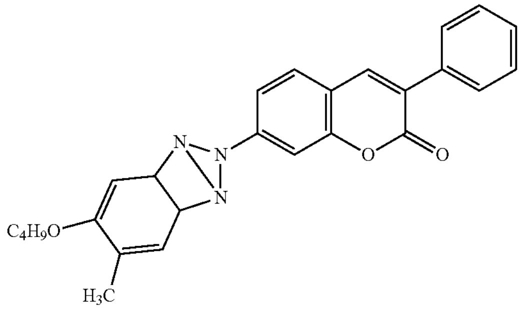

Nonionic organic dye

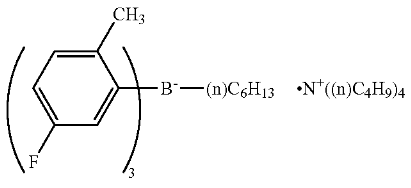

Organic boron compound

—Photocurable Composition Dispersion Liquid (2)—

5 parts by weight of the following polymerizable group-containing electron-accepting compound (3) is added to a mixture solution of 0.6 part by weight of the following organic borate compound (I), 0.1 part by weight of the spectral sensitizing dye-based borate compound (I), 0.1 part by weight of the following assistant (1) for improvement in sensitivity, and 3 parts by weight of isopropyl acetate (solubility in water: approximately 4.3%).

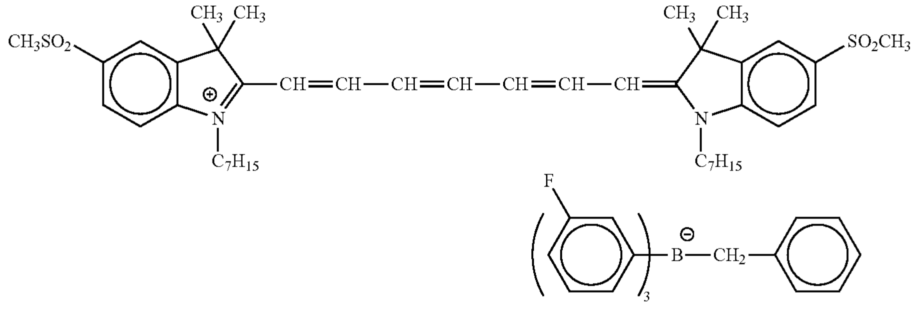

Organic borate compound (I)

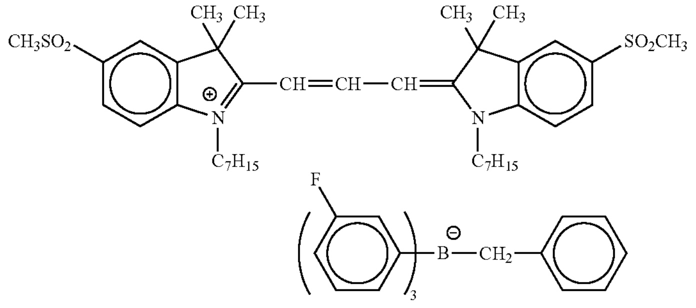

Spectral sensitizing compound dye-based borate compound (I)

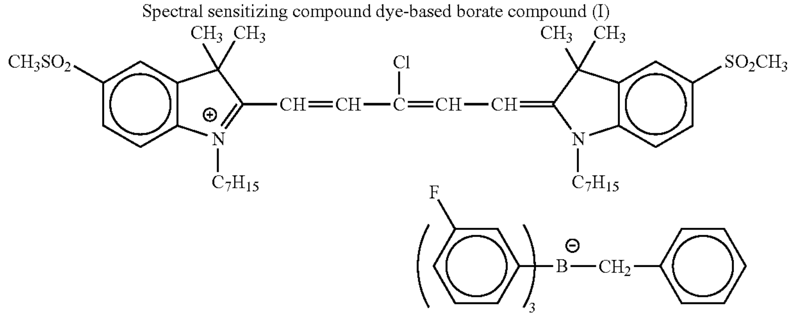

Spectral sensitizing compound dye-based borate compound (II)

The solution obtained is added to a mixture solution of 13 parts by weight of an aqueous 13% gelatin solution, 0.8 part by weight of the following aqueous 2% surfactant (2) solution, and 0.8 part by weight of the following aqueous 2 % surfactant (3) solution. The resultant mixture is emulsified in a homogenizer (manufactured by Nippon Seiki Co., Ltd.) at a rotational speed of 10,000 rpm for 5 minutes, to give a photocurable composition dispersion liquid (2).

The structural formulae of the polymerizable group-containing electron-accepting compound (3), the auxiliary agent (1), the surfactant (2) and the surfactant (3) used in the preparation of the photocurable composition dispersion liquid (2) are shown below.

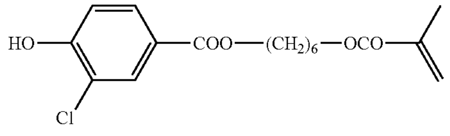

Polymerizable group-containing electron-accepting compound (3)

-continued

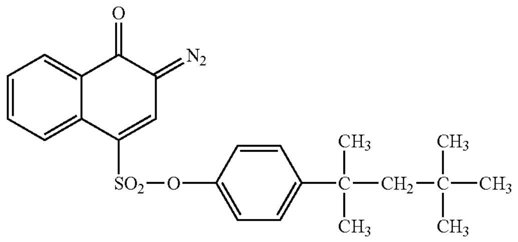

Auxiliary agent (1)

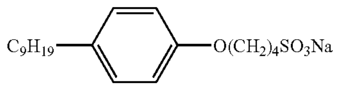

Surfactant (2)

-continued

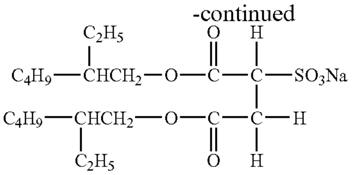

Surfactant (3)

—Photocurable Composition Dispersion Liquid (3)—

A photocurable composition dispersion liquid (3) is prepared in the same manner as the preparation of the photocurable composition dispersion liquid (2) except that the spectral sensitizing dye-based borate compound (I) is replaced with 0.1 part by weight of the spectral sensitizing dye-based borate compound (II) shown above.

(Preparation of Resin Particle Dispersion Liquid)

Styrene: 460 parts by weight n-Butyl acrylate: 140 parts by weight

Acrylic acid: 12 parts by weight

Dodecanethiol: 9 parts by weight

The components above are mixed and dissolved to give a solution. Then, the solution is added to a solution of 12 parts by weight of an anionic surfactant (trade name: DOW-FAX, manufactured by Rhodia) in 250 parts by weight of ion-exchange water, to give an emulsion liquid (monomer emulsion liquid A) dispersed and emulsified in a flask.

Separately, 1 part by weight of an anionic surfactant (trade name: DOW-FAX, manufactured by Rhodia) is dissolved in 555 parts by weight of ion-exchange water, and the solution is added to the polymerization flask. The polymerization flask is sealed tightly and equipped with a reflux condenser, and the mixture in the flask is heated to 75° C. using a water bath and kept at the same temperature while being stirred gently and being supplied with nitrogen.

Then, a solution containing 9 parts by weight of ammonium persulfate dissolved in 43 parts by weight of ion-exchange water is added dropwise into the polymerization flask by a metering pump over a period of 20 minutes, and additionally, the monomer emulsion liquid A is added dropwise by a metering pump over a period of 200 minutes.

The mixture is then stirred gently for 3 hours while the polymerization flask is kept at 75° C., to complete polymerization.

As a result, a resin particle dispersion liquid is obtained which contains particles having a median diameter of 210 nm, a glass transition point of 51.5° C., a weight-average molecular weight of 31,000, and a solid content of 42 wt %.

(Preparation of Toner 1 (Coloring Part Dispersion Structure Type))

—Preparation of Photo- and Thermo-Sensitive Capsule Dispersion Liquid (1)—

Microcapsule dispersion liquid (1): 150 parts by weight

Photocurable composition dispersion liquid (1): 300 parts by weight

Polyaluminum chloride: 0.20 part by weight

Ion-exchange water: 300 parts by weight

A raw material solution containing the components above is adjusted to pH 3.5 by addition of nitric acid. The raw material solution is sufficiently mixed and dispersed in a homogenizer (trade name: ULTRA-TURRAX-50, manufactured by IKA) and then transferred into a flask. The mixture is heated to 40° C. and kept at 40° C. for 60 minutes in a heating oil bath while stirred with a Three One Motor. 300 parts by weight of the resin particle dispersion liquid is further added, and the mixture is stirred gently at 60° C. for 2 hours to give a photo- and thermo-sensitive capsule dispersion liquid (1).

The volume-average particle diameter of the photo- and thermo-sensitive capsules dispersed in the dispersion liquid is 3.53 μm. There is no spontaneous coloring of the dispersion liquid during the preparation thereof.

—Preparation of Photo- and Thermo-Sensitive Capsule Dispersion Liquid (2)—

Microcapsule dispersion liquid (2): 150 parts by weight

Photocurable composition dispersion liquid (2): 300 parts by weight

Polyaluminum chloride: 0.20 part by weight

Ion-exchange water: 300 parts by weight

A photo- and thermo-sensitive capsule dispersion liquid (2) is prepared in the same manner as in the preparation of the photo- and thermo-sensitive capsule dispersion liquid (1) except that the components above are used as the raw material solution.

The volume-average particle diameter of the photo- and thermo-sensitive capsules dispersed in the dispersion liquid is 3.52 μm. There is no spontaneous coloring of the dispersion liquid during the preparation thereof.

—Preparation of Photo- and Thermo-Sensitive Capsule Dispersion Liquid (3)—

Microcapsule dispersion liquid (3): 150 parts by weight

Photocurable composition dispersion liquid (3): 300 parts by weight

Polyaluminum chloride: 0.20 part by weight

Ion-exchange water: 300 parts by weight

A photo- and thermo-sensitive capsule dispersion liquid (3) is prepared in the same manner as in the preparation of the photo- and thermo-sensitive capsule dispersion liquid (1) except that the components above are used as the raw material solution.

The volume-average particle diameter of the photo- and thermo-sensitive capsules dispersed in the dispersion liquid is 3.47 μm. There is no spontaneous coloring of the dispersion liquid during the preparation thereof.

—Preparation of Toner—

Photo- and thermo-sensitive capsule dispersion liquid (1): 750 parts by weight

Photo- and thermo-sensitive capsule dispersion liquid (2): 750 parts by weight

Photo- and thermo-sensitive capsule dispersion liquid (3): 750 parts by weight

A mixture solution of the above dispersion liquids is placed in a flask, heated to 42° C. in a heating oil bath, and kept at 42° C. for 60 minutes while stirred. 100 parts by weight of the resin particle dispersion liquid is added thereto, and the mixture is stirred gently.

Then, the pH in the flask is adjusted to 5.0 by addition of an aqueous 0.5 mole/liter sodium hydroxide solution, and the mixture is heated to 55° C. while stirred. The pH in the flask is maintained at more than 4.5 by further addition of the aqueous sodium hydroxide solution; otherwise, the pH in the flask would decrease to 5.0 or less during the heating to 55° C. normally. The mixture is left at 55° C. for 3 hours in this state.

After the completion of the reaction, the mixture is cooled, filtered, washed sufficiently with ion-exchange water, and is subjected to Nuche suction filtration so as to achieve liquid/solid separation. The solid is redispersed in 3 liters of ion-exchange water in a 5-liter beaker at 40° C., stirred at 300 rpm for 15 minutes, and washed. This washing operation is repeated five times. Then the resulting product is subjected to Nuche suction filtration to perform solid/liquid separation. Thereafter, the product is freeze-dried for 12 hours to give toner particles containing photo- and thermo-sensitive capsules dispersed in a styrene resin. The particle diameter of the toner particles is determined with a Coulter Counter(condition:aperture 径100 μm), and the volume-average particle diameter D50v is found to be 15.2 μm. Then, 1.0 part by weight of hydrophobic silica (trade name: TS720, manufactured by Cabot) is added to 50 parts by weight of the toner particles, and the silica and the toner particles are mixed in a sample mill to give a toner 1 carrying the external additive.

(Preparation of Toner 2 (Concentric Ring Structure Type))

—Preparation of Toner—

Microcapsule dispersion liquid (1): 150 parts by weight
Photocurable composition dispersion liquid (1): 300 parts by weight
Polyaluminum chloride: 0.20 part by weight
Ion-exchange water: 300 parts by weight A solution prepared by mixing the components above is adjusted to pH 3.5 by addition of nitric acid. The solution is sufficiently mixed and dispersed in a homogenizer (trade name: ULTRA-TURRAX-50, manufactured by IKA) and then is transferred into a flask. The mixture is heated to 40° C. and kept at 40° C. for 60 minutes in a heating oil bath while stirred with a Three One Motor. 300 parts by weight of the resin particle dispersion liquid is further added thereto, and the mixture is stirred gently.

Thereafter, the pH in the flask is adjusted to 7.5 by addition of an aqueous 0.5 mole/liter sodium hydroxide solution, and the mixture is heated to 60° C. while stirred, then gently stirred at 60° C. for 2 hours, removed once from the flask, left and cooled, to give a photo- and thermo-sensitive capsule dispersion liquid.

The volume-average particle diameter of photo- and thermo-sensitive capsules dispersed in this dispersion liquid is 4.50 μm. There is no spontaneous coloring of the dispersion liquid during the preparation thereof.

Then, a mixed solution of the following components is added to the photo- and thermo-sensitive capsule dispersion liquid, adjusted to pH 3.5 with nitric acid and sufficiently mixed and dispersed in a homogenizer (ULTRA-TURRAX-50, manufactured by IKA).

Microcapsule dispersion liquid (2): 150 parts by weight
Photocurable composition dispersion liquid (2): 300 parts by weight
Polyaluminum chloride: 0.20 part by weight
Ion-exchange water: 300 parts by weight Then, the above solution after mixed and dispersed is transferred again into a flask. The mixture is heated to 40° C. and kept at 40° C. for 60 minutes in a heating oil bath while stirred with a Three One Motor. 200 parts by weight of the resin particle dispersion liquid is further added thereto, and the mixture is stirred gently.

Thereafter, the pH in the flask is adjusted to 7.5 by addition of an aqueous 0.5 mole/liter sodium hydroxide solution, and the mixture is heated to 60° C. while stirred, then gently stirred at 60° C. for 2 hours, removed once from the flask, left and cooled, to give a photo- and thermo-sensitive capsule dispersion liquid.

The volume-average particle diameter of photo- and thermo-sensitive capsules dispersed in this dispersion is 6.0 μm. There is no spontaneous coloring of the dispersion liquid during the preparation thereof.

Then, a mixed solution of the following components is added to the photo- and thermo-sensitive capsule dispersion liquid, adjusted to pH 3.5 with nitric acid and sufficiently mixed and dispersed in a homogenizer (trade name: ULTRA-TURRAX-50, manufactured by IKA).

Microcapsule dispersion liquid (3): 150 parts by weight
Photocurable composition dispersion liquid (3): 300 parts by weight
Polyaluminum chloride: 0.20 part by weight
Ion-exchange water: 300 parts by weight Then, the above solution after mixed and dispersed is transferred again into a flask. The mixture is heated to 40° C. and kept at 40° C. for 60 minutes in a heating oil bath while stirred with a Three One Motor. 100 parts by weight of the resin particle dispersion liquid is further added thereto, and the mixture is stirred gently at 60° C. for 2 hours.

Thereafter, the pH in the flask is adjusted to 5.0 by addition of an aqueous 0.5 mole/liter sodium hydroxide solution, and the mixture is heated to 55° C. while stirred. During temperature rising to 55° C., the pH in the flask is generally reduced to 5.0 or less, but the pH is maintained so as not to be reduced to 4.5 or less by adding an aqueous solution of sodium hydroxide dropwise. In this state, the dispersion is kept at 55° C. for 3 hours. There is no spontaneous coloring of the dispersion liquid during the preparation thereof.

After the completion of the reaction, the mixture is cooled, filtered, washed sufficiently with ion-exchange water, and is subjected to Nuche suction filtration so as to achieve liquid/solid separation. The solid is redispersed in 3 liters of ion-exchange water in a 5-liter beaker at 40° C., stirred at 300 rpm for 15 minutes, and washed. This washing operation is repeated five times. Then the resulting product is subjected to Nuche suction filtration to perform solid/liquid separation. Thereafter, the product is freeze-dried for 12 hours to give toner particles.

The particle diameter of the toner particles is determined with a Coulter Counter, and the volume-average particle diameter D50v is found to be 7.5 μm. Then, 1.0 part by weight of hydrophobic silica (trade name: TS720, manufactured by Cabot) is added to 50 parts by weight of the toner particles, and the silica and the toner particles are mixed in a sample mill to give a toner 2 having the external additive.

B. Photocoloring Toner (Preparation of Microcapsule Dispersion Liquid)

—Microcapsule Dispersion Liquid (1)—

12.1 parts by weight of the electron-donating colorless dye (1) is dissolved in 10.2 parts of ethyl acetate, and 12.1 parts by weight of dicyclohexyl phthalate, 26 parts by weight of TAKENATE D-110N (trade name, manufactured by Takeda Pharmaceutical Company Limited.) and 2.9 parts by weight of MILLIONATE MR200 (trade name, manufactured by Nippon Polyurethane Industry Co., Ltd.) are added thereto.

The resulting solution is added to a mixed solution containing 5.5 parts by weight of polyvinyl alcohol and 73 parts by weight of water, and the mixture is emulsified and dispersed at a temperature of 20° C., to give an emulsion liquid having an average particle diameter of 0.5 μm. Then, 80 parts by weight of water is added to the emulsion liquid obtained, and the mixture is heated to 60° C. while stirred for 2 hours, to give a microcapsule dispersion liquid (1) wherein microcapsules containing the electron-donating colorless dye (1) as core material are dispersed.

The glass transition temperature of the material constituting the shell of the microcapsules contained in the microcapsule dispersion liquid (1) (material prepared in reaction of dicyclohexyl phthalate, TAKENATE D-110N and MILLIONATE MR200 under a condition almost the same as that described above) is 130° C.

—Microcapsule Dispersion Liquid (2)—

A microcapsule dispersion liquid (2) is prepared in the same manner as in the preparation of the microcapsule dispersion liquid (1) except that the electron-donating colorless dye (1) is replaced with an electron-donating colorless dye (2).

—Microcapsule Dispersion Liquid (3)—

A microcapsule dispersion liquid (3) is prepared in the same manner as in the preparation of the microcapsule dispersion liquid (1) except that the electron-donating colorless dye (1) is replaced with an electron-donating colorless dye (3).

(Preparation of Photocurable Composition Dispersion Liquid)

—Photocurable Composition Dispersion Liquid (1)—

9 parts of the electron-accepting compound (1) and 7.5 parts of trimethylol propane triacrylate monomer (trifunctional acrylate, molecular weight of about 300) are added to a solution of 1.62 parts of photopolymerization initiator (1-*a*) and 0.54 part of photopolymerization initiator (1-*b*) dissolved in 4 parts of ethyl acetate.

The solution obtained is added to a mixture solution of 19 parts of 15% PVA (polyvinyl alcohol), 5 parts of water, 0.8 part of aqueous 2% surfactant (1), and 0.8 part of aqueous 2% surfactant (2). The resultant mixture is emulsified in a homogenizer (manufactured by Nippon Seiki Co., Ltd.) at 8,000 rpm for 7 minutes, to give a photocurable composition dispersion liquid (1) in the form of an emulsified liquid.

—Photocurable Composition Dispersion Liquid (2)—

A photocurable composition dispersion liquid (2) is prepared in the same manner as in the preparation of the photocurable composition dispersion liquid (1) except that the photopolymerization initiators (1-a) and (1-b) are replaced with 0.08 part of polymerization initiator (2-a), 0.18 part of polymerization initiator (2-b) and 0.18 part of polymerization initiator (2-c).

—Photocurable Composition Dispersion Liquid (3)—

A photocurable composition dispersion liquid (3) is prepared in the same manner as in the preparation of the photocurable composition dispersion liquid (1) except that the photopolymerization initiator (2-b) used in the photocurable composition dispersion liquid (2) is replaced with polymerization initiator (3-b).

Chemical structures of the photopolymerization initiators (1-a), (1-b), (2-a), (2-b), (2-c) and (3-b), the electron-accepting compound (1), and the surfactants (1) to (2) used in the photocurable composition dispersion liquids are shown below.

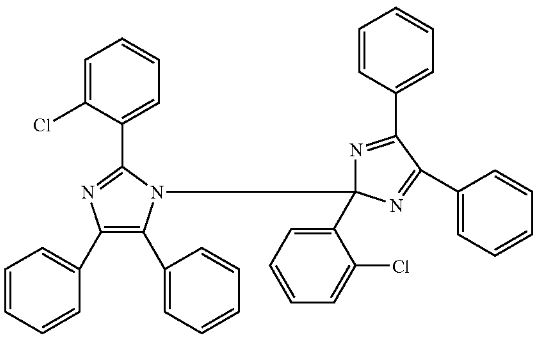

Photopolymerization initiator (1-a)

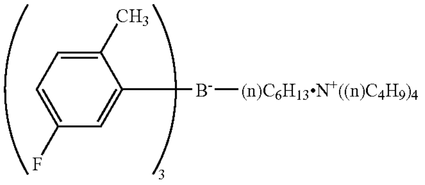

Photopolymerization initiator (1-b)

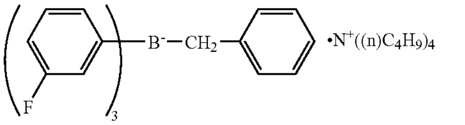

Photopolymerization initiator (2-a)

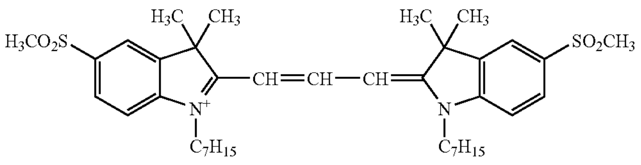

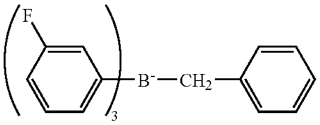

Photopolymerization initiator (2-b)

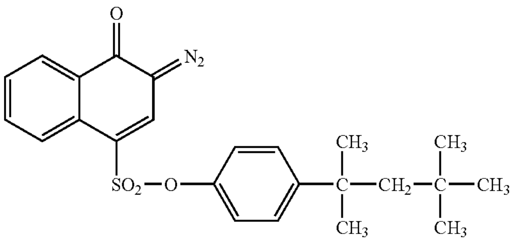

Photopolymerization initiator (2-c)

-continued

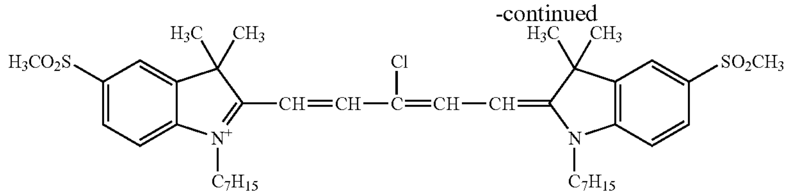

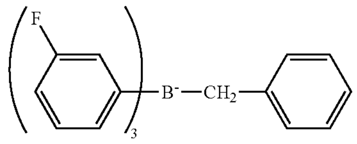

Photopolymerization initiator (3-b)

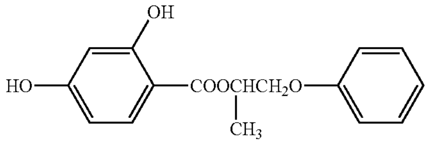

Electron-accepting compound (1)

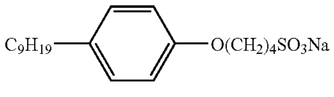

Surfactant (1)

$C_{12}H_{25}SO_3Na$

Surfactant (2)

—Preparation of Resin Particle Dispersion Liquid (1)—

Styrene: 360 parts n-Butyl acrylate: 40 parts

Acrylic acid: 4 parts

Dodecanethiol: 24 parts

Carbon tetrabromide: 4 parts

The components above are mixed and dissolved to give a solution. Then, the solution is added to a solution of 6 parts of an anionic surfactant (trade name: NONIPOL 400, manufactured by Sanyo Chemical Industries, Ltd.) and 10 parts of an anionic surfactant (trade name: NEOGEN SC, manufactured by Dai-Ichi Kogyo Seiyaku Corporation) in 560 parts of ion-exchange water, then dispersed and emulsified in a flask and mixed gently for 10 minutes, followed by introducing 50 parts of ion-exchange water containing 4 parts of ammonium persulfate dissolved therein.

Subsequently, the atmosphere in the flask is replaced with nitrogen, and the mixture in the flask is heated to 70° C. on an oil bath under stirring and subjected as such to emulsion polymerization for 5 hours. In this manner, a resin particle dispersion liquid (1) (resin particle density: 30%) in which resin particles having a volume-average particle diameter of 200 nm, a grass transition temperature of 50° C., a weight-average molecular weight (Mw) of 16200, and a specific gravity of 1.2 are obtained.

—Preparation of Photo- and Thermo-Sensitive Capsule Dispersion Liquid (1)—

Microcapsule dispersion liquid (1): 24 parts

Photocurable composition dispersion liquid (1): 232 parts

The components above are mixed and dispersed sufficiently in a round stainless steel flask with ULTRA-TURRAX T50 manufactured by IKA.

Then, the mixture is adjusted to pH 3 by addition of nitric acid, then 0.20 part of polyaluminum chloride is added thereto, and the mixture is dispersed for 10 minutes at a rotational speed of 6000 rpm with ULTRA-TURRAX. The mixture is heated to 40° C. in the flask under gentle stirring on a heating oil bath.

The resin particle dispersion liquid (1), 60 parts, is gently added thereto.

In this manner, a photo- and thermo-sensitive capsule dispersion liquid (1) is obtained. The volume-average particle diameter of the photo- and thermo-sensitive capsules dispersed in the dispersion liquid is about 2 μm. There is no spontaneous coloring of the dispersion liquid during the preparation thereof.

—Preparation of Photo- and Thermo-Sensitive Capsule Dispersion Liquid (2)—

A photo- and thermo-sensitive capsule dispersion liquid (2) is prepared in the same manner as in the preparation of the photo- and thermo-sensitive capsule dispersion liquid (1) except that the microcapsule dispersion liquid (2) is used in place of the microcapsule dispersion liquid (1), and the photocurable composition dispersion liquid (2) is used in place of the photocurable composition dispersion liquid (1). The volume-average particle diameter of the photo- and thermo-sensitive capsules dispersed in the dispersion liquid is about 2 μm. There is no spontaneous coloring of the dispersion liquid during the preparation thereof.

—Preparation of Photo- and Thermo-Sensitive Capsule Dispersion Liquid (3)—

A photo- and thermo-sensitive capsule dispersion liquid (3) is prepared in the same manner as in the preparation of the photo- and thermo-sensitive capsule dispersion liquid (1) except that the microcapsule dispersion liquid (3) is used in place of the microcapsule dispersion liquid (1), and the photocurable composition dispersion liquid (3) is used in place of the photocurable composition dispersion liquid (1). The volume-average particle diameter of the photo- and thermo-sensitive capsules dispersed in the dispersion liquid is about 2 μm. There is no spontaneous coloring of the dispersion liquid during the preparation thereof.

(Preparation of Toner 3 (Coloring Part Dispersion Structure Type))

—Preparation of Toner—

Photo- and Thermo-Sensitive Capsule Dispersion Liquid (1): 80 parts

Photo- and Thermo-Sensitive Capsule Dispersion Liquid (2): 80 parts

Photo- and Thermo-Sensitive Capsule Dispersion Liquid (3): 80 parts

Resin Particle Dispersion Liquid (1): 80 parts

The components above are mixed and dispersed sufficiently in a round stainless steel flask in ULTRA-TURRAX T50 manufactured by IKA.

Then, 0.1 part of polyaluminum chloride is added to the resulting mixture which is then dispersed for 10 minutes at a rotational speed of 6000 rpm with ULTRA-TURRAX. The mixture is heated to 48° C. in the flask under stirring on a heating oil bath. The mixture is kept at 48° C. for 60 minutes, and further 20 parts of the resin particle dispersion liquid (1) is gently added thereto.

Thereafter, the pH in the system is adjusted to 8.5 with 0.5 mol/l aqueous sodium hydroxide, then the stainless steel flask is sealed and the mixture is heated to 55° C. under stirring with a magnetic seal and kept in this state for 10 hours.

After the completion of the reaction, the mixture is cooled, filtered, washed sufficiently with ion-exchange water, and subjected to Nuche suction filtration to achieve liquid/solid separation. The solid is redispersed in 1 liter of ion-exchange water at 40° C. and stirred at 300 rpm for 15 minutes for washing.

This washing operation is repeated five times until the pH of the filtrate becomes 7.5 and the electric conductivity becomes 7.0 μS/cm, and then the filtrate is subjected to Nuche suction filtration with No. 5A filter paper to perform solid/liquid separation. Thereafter, the product is freeze-dried for 12 hours to give toner particles containing 3 kinds of photo- and thermo-sensitive capsules dispersed in the base material.

The volume-average particle diameter D50v of the particles as determined with a Coulter Counter is about 15 μm. There is no spontaneous coloring of the resulting toner.

Then, 100 parts of the toner (1), 0.3 part of hydrophobic titania having an average particle diameter of 15 nm surface-treated with n-decyltrimethoxysilane, and 0.4 part of hydrophobic silica having an average particle diameter of 30 nm (trade name: NY50, manufactured by Nippon Aerosil) are blended for 10 minutes at a circumferential velocity of 32 m/s with a Henschel mixer, and then course particles are removed with a sieve having an opening of 45 μm, whereby a toner 3 carrying the external additive is obtained.

<Preparation of Developer>

Then, a ferrite carrier having a volume-average particle diameter of 50 μm having a carrier core material coated thereon with polymethyl methacrylate (manufactured by Soken Chemical & Engineering Co., Ltd.) (amount of polymethyl methacrylate based on the whole weight of the carrier: 1 wt %), and the toners 1 to 3 carrying the external additive weighed out such that the toner density becomes 5 wt % based on the carrier, are stirred and mixed for 5 minutes with a ball mill to give developers (1) to (3) respectively. The developers (1) and (2) are developers using the non-photocoloring toner as described above, while the developer (3) is a developer using the photocoloring toner as described above.

Test Example 1

(Image Formation)

An image forming device similar to that shown in FIG. 1 is prepared, and the developer (1) is used as a developer.

The photoreceptor 11 is that which has an aluminium drum coated with a multilayer organic photosensitive layer of 25 μm in thickness including a charge-generating layer of gallium chloride phthalocyanine and a charge transport layer of N,N'-diphenyl-N,N'-bis(3-methylphenyl)-[1,1']biphenyl-4,4'-diamine. The charging device 12 used in this Example is Scorotron.

The exposure device 14 is an LED image bar at a wavelength of 780 nm that is capable of forming a latent image at a resolution of 600 dpi. The developing device 16 is a device equipped with a metal sleeve for two-component magnetic brush development that allows reversed development. The charging amount of the toner when the developer 1 is filled in the developing device is approximately −5 to −30 μC/g.

The color-generation information providing device 28 is an LED image bar capable of emitting lights at peak wavelengths of 405 nm (exposure energy: 0.2 mJ/cm 2), 532 nm (exposure energy: 0.2 mJ/cm$^2$), and 657 nm (exposure energy: 0.4 mJ/cm$^2$) at a resolution of 600 dpi. The transfer device 18 has, as a transfer roll, a semiconductive roll having a conductive elastomer coated on the external surface of a conductive core material. The conductive elastomer is a non-compatible blend of NBR and EPDM containing additionally two kinds of carbon blacks, Ketjen black and thermal black, dispersed therein. The conductive elastomer has a roll electric resistance of $10^{8.5}$ Ωcm and an Asker C hardness of 35.

The fixing device 22 is the fixing unit in DPC 1616 (trade name, manufactured by Fuji Xerox Co., Ltd.), and is placed at a distance of 30 cm from the point of providing color-generation information. The coloring fixing device 24 is a high-brightness schaukasten including the three wavelengths of the color-generation information providing device and having an irradiation width of 5 mm.

The printing condition for the image forming device with the configuration above is as follows:

Photoreceptor linear velocity: 10 mm/sec.

Charging condition: A voltage of −400 V is applied to the Scorotron screen while a direct current of −6 kV is applied to the wire. The surface electric potential of the photoreceptor is −400 V.

Exposure condition: Exposure is conducted based on the logical sum of Y-, M-, C-, and black-color image information, and the electric potential after exposure is approximately −50 V.

Development bias: A rectangular wave of alternate current at Vpp 1.2 kV (3 kHz) is superposed on a direct current at −330 V.

Developer contact condition: The peripheral speed ratio (developing roll/photoreceptor) is 2.0; the development gap is 0.5 mm; the developer weight on developing roll is 400 g/m$^2$; and the amount of the developed toner on the photoreceptor is 5 g/m$^2$ for a solid image.

Transfer bias: Direct current of +800 V.

Fixing temperature: Fixing roll surface temperature of 180° C.

Coloring fixing device light source: Y irradiation region: exposed to light at 405 nm. M irradiation region: exposed to light at 535 nm. C irradiation region: exposed to light at 657 nm.

Coloring fixing device illuminance: 130,000 lux.

Under the conditions described above, a sheet heater (50 W) is attached to the inside of the photoreceptor and the surface temperature of the photoreceptor (toner temperature) is kept at 40° C. or 95° C., and in this state, gray halftone images are formed. The image formed by providing color-generation information at 40° C. shows excellent coloring, while the image formed by providing color-generation information at 95° C. develops seven colors (rainbow color).

The surface of the photoreceptor is contacted with liquid nitrogen to reduce the surface temperature of the photoreceptor (toner temperature) to 0° C. or less, and images are formed in the same manner as above. The image formed by providing color-generation information at 0° C. or less does not show coloring.

Examples 2 and 3

Image formation is conducted in the same manner as in the image formation in Test Example 1 except that the developers (2) and (3) are used in place of the developer (1), and the same evaluation as in Test Example 1 is conducted. As a result, the same results as in Test Example 1 are obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device using a toner that maintains a color-generation state or non-color-generation state owing to color-generation information provided by light, the device comprising:

an image forming unit containing a developing unit that has a photoreceptor and the toner, and that forms a toner image from the toner on the photoreceptor, a color-generation information providing unit that, on the basis of color component information of image data, provides the toner that forms the toner image with color-generation information by exposing the toner image to light, a transfer unit that transfers the toner image onto a recording medium, a fixing unit that fixes the transferred toner image on the recording medium by heat or pressure, and a color-generating unit that heats the transferred toner image on the recording medium, thereby allowing each toner that forms the toner image to respectively generate a color, a toner temperature detection unit that detects a temperature of the toner before the toner is provided with color-generation information by the color-generation information providing unit, a toner temperature regulating unit that regulates the temperature of the toner when the toner is provided with color-generation information by the color-generation information providing unit, and a control unit that, on the basis of a detection result of the toner temperature detection unit, controls the toner temperature regulating unit such that the temperature of the toner when the toner is provided with color-generation information by the color-generation information providing unit is in a predetermined range.

2. The image forming device of claim 1, wherein the control unit controls the image forming unit on the basis of a detection result of the toner temperature detection unit.

3. The image forming device of claim 2, wherein the control unit controls the image forming unit so as to allow or inhibit image formation on the basis of a detection result of the toner temperature detection unit.

4. The image forming device of claim 1, further comprising:

at least one of a process cartridge provided with at least the developing unit, or a toner cartridge storing the toner, the respective cartridges being detachable from the body of the image forming device, a temperature-indicating material that changes color depending on applied heat, which is disposed on an external surface of the process cartridge or the toner cartridge, and a color detection unit that detects the color change of the temperature-indicating material, wherein the control unit further controls the image forming unit on the basis of a detection result of the color detection unit.

5. The image forming device of claim 4, wherein the control unit further controls the image forming unit so as to allow or inhibit image formation on the basis of a detection result of the toner temperature detection unit.

6. The image forming device of claim 1, further comprising a toner-condition detection unit that detects a condition of the toner color generated by the color-generating unit, wherein the control unit further controls the image forming unit on the basis of a detection result of the toner-condition detection unit.

7. The image forming device of claim 6, wherein the control unit further controls the image forming unit so as to allow or inhibit image formation on the basis of a detection result of the toner-condition detection unit.

8. The image forming device of claim 1, wherein exposure energy of a light from the color-generation information providing device is in the range of from about 0.05 to about 0.8 $mJ/cm^2$.

9. The image forming device of claim 1, wherein the photoreceptor has a surface layer.

10. The image forming device of claim 9, wherein the surface layer is a dichroic mirror coat or a sharp cut filter.

11. The image forming device of claim 1, wherein the toner temperature regulating unit is a heater inside of the photoreceptor.

12. The image forming device of claim 11, wherein the heater is a sheet heater.

13. The image forming device of claim 1, wherein the toner contains a color-generating region capable of generating yellow color (Y color-generating portion), a color-generating portion capable of developing magenta color (M color-generating portion) and a color-generating portion capable of developing cyan color (C color-generating portion) in a toner particle.

14. The image forming device of claim 1, wherein the toner temperature detection unit is a temperature detection sensor and is disposed between the developing unit and the color-generation information providing unit.

15. The image forming device of claim 14, wherein the temperature detection sensor is an infrared thermometer.

16. The image forming device of claim 1, wherein the color-generation information providing unit comprises a light source that provides color-generation information for coloring a yellow color-generating portion, a light source that provides color-generation information for coloring a magenta color-generating portion, and a light source that provides color-generation information for coloring a cyan color-generating portion.

17. The image forming device of claim 1, wherein the fixing unit and the color-generating unit are combined as a fixing device.

18. The image forming device of claim 1, further comprising a coloring fixing device that irradiates light on a recording medium after fixing.

19. A method of forming an image comprising:

forming an image with a toner that maintains a color-generation state or non-color-generation state owing to color-generation information provided by light, comprising developing a toner image with the toner on a photoreceptor, and providing the toner that forms the toner image with color-generation information by exposing the toner image to light, on the basis of color component information of image data, transferring the toner image onto a recording medium, fixing the transferred toner image on the recording medium by heat and/or pressure, and heating the transferred toner image on the recording medium thereby allowing each toner of the toner image to respectively develop a color corresponding to the wavelength of the light applied by the color-generation information providing unit, or a color other than the color corresponding to the wavelength of the light;

detecting a temperature of the toner before the toner is provided with color-generation information;

regulating the temperature of the toner when the toner is provided with color-generation information; and controlling during the toner temperature regulating such that the temperature of the toner when the toner is provided with color-generation information is in a predetermined range, on the basis of a detection result of the toner temperature detecting.

* * * * *